US012573055B2

(12) United States Patent
Piao

(10) Patent No.: US 12,573,055 B2
(45) Date of Patent: Mar. 10, 2026

(54) IMAGE PROCESSING APPARATUS

(71) Applicant: NEC Corporation, Tokyo (JP)

(72) Inventor: Jun Piao, Tokyo (JP)

(73) Assignee: NEC CORPORATION, Tokyo (JP)

( * ) Notice: Subject to any disclaimer, the term of this patent is extended or adjusted under 35 U.S.C. 154(b) by 329 days.

(21) Appl. No.: 18/033,181

(22) PCT Filed: Oct. 29, 2020

(86) PCT No.: PCT/JP2020/040645
§ 371 (c)(1),
(2) Date: Apr. 21, 2023

(87) PCT Pub. No.: WO2022/091300
PCT Pub. Date: May 5, 2022

(65) Prior Publication Data
US 2023/0401722 A1      Dec. 14, 2023

(51) Int. Cl.
*G06T 7/174* (2017.01)
*G06V 10/26* (2022.01)
*G06V 20/52* (2022.01)

(52) U.S. Cl.
CPC .............. *G06T 7/174* (2017.01); *G06V 10/26* (2022.01); *G06V 20/52* (2022.01); *G06T 2207/20044* (2013.01); *G06V 2201/07* (2022.01); *G06V 2201/10* (2022.01)

(58) Field of Classification Search
CPC . G06T 7/174; G06T 2207/20044; G06T 7/00; G06T 7/60; G06V 10/26; G06V 20/52; G06V 2201/07; G06V 2201/10; G06V 10/82

USPC .......................................................... 382/103
See application file for complete search history.

(56) References Cited

FOREIGN PATENT DOCUMENTS

JP          2017016344 A   *   1/2017
JP          2018-506788 A       3/2018

OTHER PUBLICATIONS

International Search Report for PCT Application No. PCT/JP2020/040645, mailed on Jan. 19, 2021.

* cited by examiner

*Primary Examiner* — Amandeep Saini
(74) *Attorney, Agent, or Firm* — Sughrue Mion, PLLC

(57)          ABSTRACT

An image processing apparatus includes: an image accruing means acquiring a plurality of images captured at different times; a personal item detecting means detecting a personal item from each of the images; a skeleton information detecting means detecting skeleton information of a person from each of the images; a reidentification personal item selecting means selecting a personal item to reidentify by the detected personal item and skeleton information of the person; and a personal item reidentifying means determining whether or not a personal item to reidentify selected from one image of the plurality of images and a personal item to reidentify selected from another image of the images are identical personal items.

4 Claims, 19 Drawing Sheets

FIG. 7

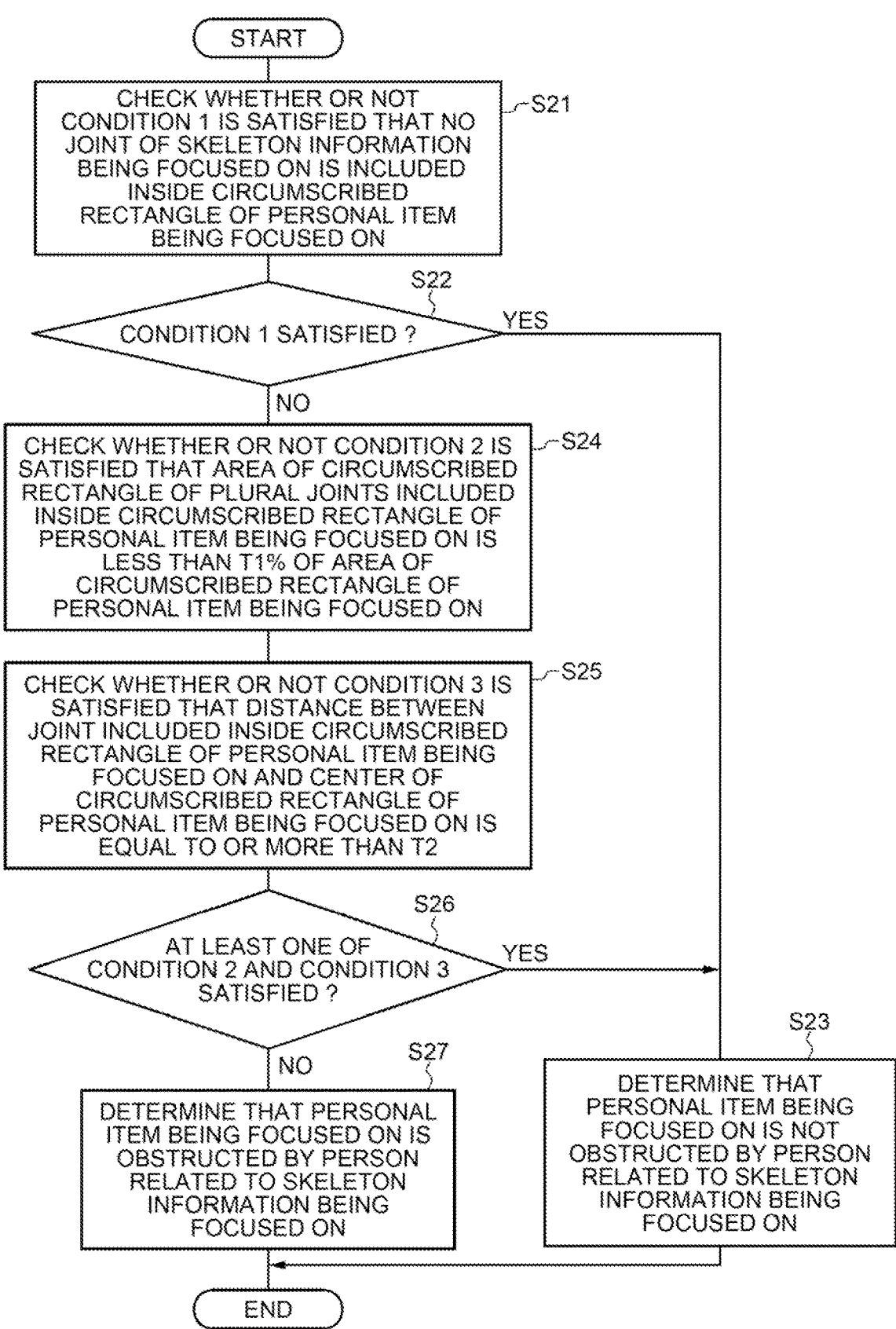

START

CHECK WHETHER OR NOT
CONDITION 1 IS SATISFIED THAT NO
JOINT OF SKELETON INFORMATION
BEING FOCUSED ON IS INCLUDED
INSIDE CIRCUMSCRIBED
RECTANGLE OF PERSONAL ITEM
BEING FOCUSED ON ⟋S21

CONDITION 1 SATISFIED ?  S22  YES

NO

CHECK WHETHER OR NOT CONDITION 2 IS S24
SATISFIED THAT AREA OF CIRCUMSCRIBED
RECTANGLE OF PLURAL JOINTS INCLUDED
INSIDE CIRCUMSCRIBED RECTANGLE OF
PERSONAL ITEM BEING FOCUSED ON IS
LESS THAN T1% OF AREA OF
CIRCUMSCRIBED RECTANGLE OF
PERSONAL ITEM BEING FOCUSED ON

CHECK WHETHER OR NOT CONDITION 3 IS S25
SATISFIED THAT DISTANCE BETWEEN
JOINT INCLUDED INSIDE CIRCUMSCRIBED
RECTANGLE OF PERSONAL ITEM BEING
FOCUSED ON AND CENTER OF
CIRCUMSCRIBED RECTANGLE OF
PERSONAL ITEM BEING FOCUSED ON IS
EQUAL TO OR MORE THAN T2

AT LEAST ONE OF
CONDITION 2 AND CONDITION 3
SATISFIED ?  S26  YES

NO  S27

DETERMINE THAT PERSONAL
ITEM BEING FOCUSED ON IS
OBSTRUCTED BY PERSON
RELATED TO SKELETON
INFORMATION BEING
FOCUSED ON

S23

DETERMINE THAT
PERSONAL ITEM BEING
FOCUSED ON IS NOT
OBSTRUCTED BY PERSON
RELATED TO SKELETON
INFORMATION BEING
FOCUSED ON

END

1502

1502

1502

| SHOOTING TIME | | |
|---|---|---|
| TEMPORARY PERSONAL ITEM ID<br><br>TEMPORARY PERSON ID | TEMPORARY PERSONAL ITEM ID1 | TEMPORARY PERSONAL ITEM ID2 |
| TEMPORARY PERSON ID1 | ◯ | ✕ |
| TEMPORARY PERSON ID2 | ✕ | ◯ |

| SHOOTING TIME t-n<br>SHOOTING TIME t | TEMPORARY<br>PERSONAL ITEM<br>ID1 | TEMPORARY<br>PERSONAL ITEM<br>ID2 |
|---|---|---|
| TEMPORARY PERSONAL ITEM ID1 | × | ○ |
| TEMPORARY PERSONAL ITEM ID2 | ○ | × |

1508

15082

15081    15083    15084

IMAGE PROCESSING APPARATUS

This application is a National Stage Entry of PCT/JP2020/040645 filed on 29 Oct. 2020, the contents of all of which are incorporated herein by reference, in their entirety.

TECHNICAL FIELD

The present invention relates to an image processing apparatus, an image processing method, and a recording medium.

BACKGROUND ART

A technique for finding identical objects from a plurality of images as input is called a reidentification technique. A literature that describes a reidentification technique is, for example, Patent Literature 1. In this description, reidentification in a case where an object is a person is referred to as person reidentification, and reidentification in a case where an object is an object other than a person is referred to as object reidentification. The present invention primarily relates to object reidentification.

CITATION LIST

Patent Literature

Patent Literature 1: Japanese Translation of PCT International Application Publication No. JP-A 2018-506788

SUMMARY OF INVENTION

Technical Problem

A system that determines whether or not the personal items of persons shown in different images are the same by using a reidentification technique uses an object detection technique to detect an image including the whole or part of a personal item to reidentify from an image captured by a surveillance camera, for example. Then, the system uses the reidentification technique to compare the detected image with another image including the whole or part of a personal item acquired and stored by the same method as described above, and outputs a reidentification result representing whether or not the respective images are images related to identical personal items based on the result of comparison. At the time, when a personal item detected from an image in which part of the personal item is obstructed by a person is unconditionally selected as a personal item to reidentify, incorrect personal item reidentification frequently occurs. That is to say, the frequency increases of outputting an incorrect reidentification result indicating that the personal items shown by the respective images are different despite being identical. Alternatively, the frequency increases of outputting an incorrect reidentification result indicating that the personal items shown by the respective images are identical despite being different. This occurs mainly when there is a difference in robustness to occlusion between object detection and reidentification.

The present invention provides an image processing apparatus that solves the abovementioned problem, namely, a problem that incorrect personal item reidentification frequently occurs when a personal item detected from an image is unconditionally selected as an item to reidentify.

Solution to Problem

An image processing apparatus as an aspect of the present invention is an image processing apparatus including: an image accruing means acquiring a plurality of images captured at different times; a personal item detecting means detecting a personal item from each of the images; a skeleton information detecting means detecting skeleton information of a person from each of the images; a reidentification personal item selecting means selecting a personal item to reidentify by the detected personal item and skeleton information of the person; and a personal item reidentifying means determining whether or not a personal item to reidentify selected from one image of the plurality of images and a personal item to reidentify selected from another image of the images are identical personal items.

Further, an image processing method as another aspect of the present invention is an image processing method including: acquiring a plurality of images captured at different times;

detecting a personal item from each of the images; detecting skeleton information of a person from each of the images; selecting a personal item to reidentify by the detected personal item and skeleton information of the person; and determining whether or not a personal item to reidentify selected from one image of the plurality of images and a personal item to reidentify selected from another image of the images are identical personal items.

Further, a computer-readable recording medium as another aspect of the present invention has a program recorded thereon, and the program is for causing a computer to execute: a process of acquiring a plurality of images captured at different times; a process of detecting a personal item from each of the images; a process of detecting skeleton information of a person from each of the images; a process of selecting a personal item to reidentify by the detected personal item and skeleton information of the person; and a process of determining whether or not a personal item to reidentify selected from one image of the plurality of images and a personal item to reidentify selected from another image of the images are identical personal items.

Advantageous Effects of Invention

With the configurations as described above, the present invention can prevent increase of incorrect personal item reidentification.

BRIEF DESCRIPTION OF DRAWINGS

FIG. 7 is a flowchart showing the details of step S17 of FIG. 6.

DESCRIPTION OF EMBODIMENTS

Next, example embodiments of the present invention will be described in detail with reference to the drawings.

First Example Embodiment

Figure 1:
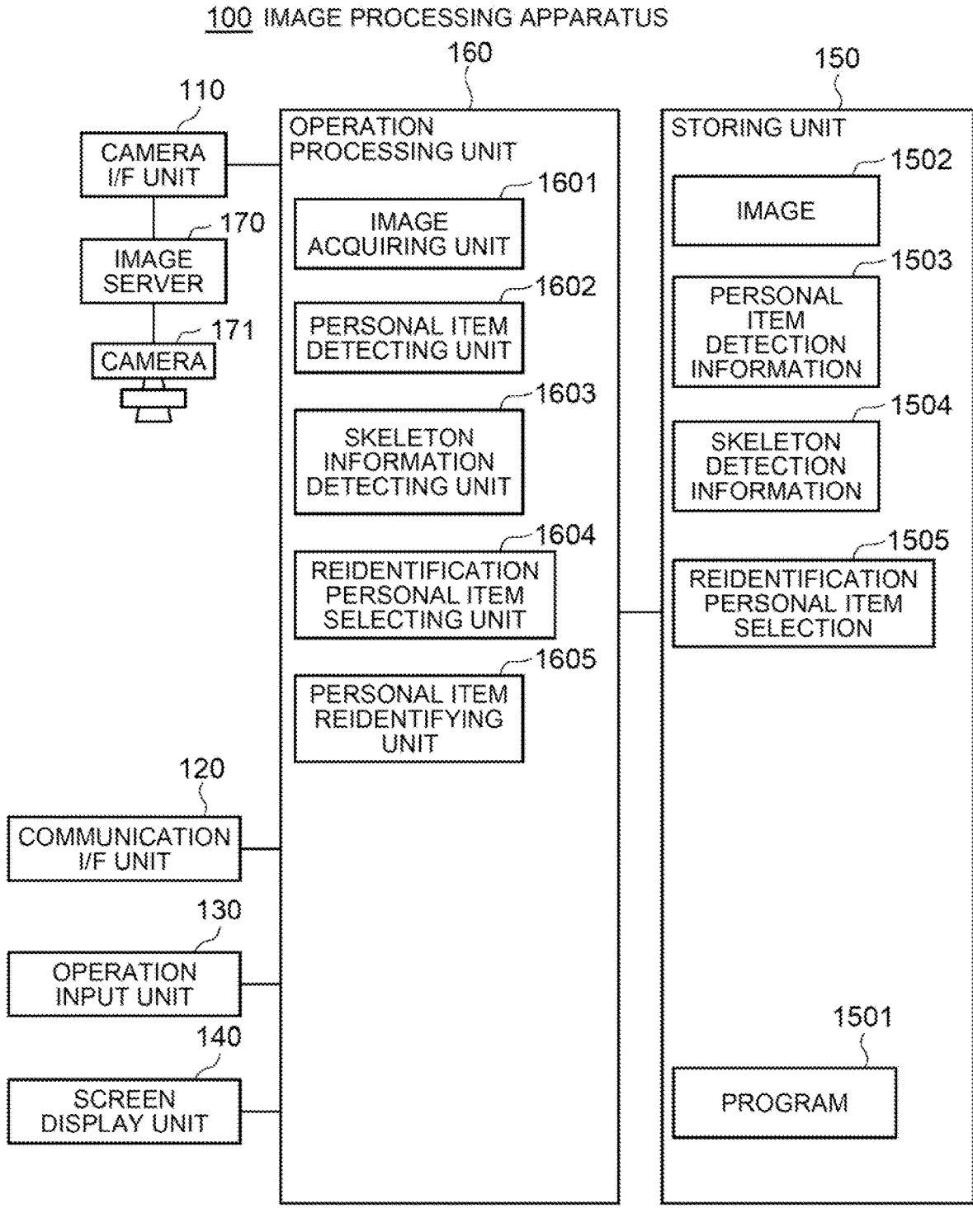
FIG. 1 is a block diagram of an image processing apparatus according to a first example embodiment of the present invention.

FIG. 1 is a block diagram of an image processing apparatus 100 according to a first example embodiment of the present invention. Referring to FIG. 1, the image processing apparatus 100 is configured including a camera I/F (interface) unit 110, a communication I/F unit 120, an operation input unit 130, a screen display unit 140, a storing unit 150, and an operation processing unit 160.

The camera I/F unit 110 is connected to an image server 170 by wire or wireless, and is configured to perform transmission and reception of data between the image server 170 and the operation processing unit 160. The image server 170 is connected to a camera 171 by wire or wireless, and is configured to accumulate a plurality of images captured at different shooting times by the camera 171 for a certain period in the past. The camera 171 may be, for example, a color camera including a CCD (Charge-Coupled Device) image sensor or a CMOS (Complementary MOS) image sensor having a pixel capacity of several million pixels. The camera 171 may be a camera installed on the street, indoors or the like where many people and things come and go for the purpose of crime prevention and surveillance. The camera 171 may also be a camera that captures identical or different shooting regions in a fixed shooting direction from a fixed place. Alternatively, the camera 171 may be a camera that is mounted on a moving object such as a vehicle to capture identical or different shooting regions while moving. The number of the camera 171 is not limited to one, and may be plural.

The communication I/F unit 120 is formed of a data communication circuit, and is configured to perform data communication with an external device, which is not illustrated in the drawings, by wire or wireless. The operation input unit 130 is formed of an operation input device such as a keyboard and a mouse, and is configured to detect operator's operation and output to the operation processing unit 160. The screen display unit 140 is formed of a screed display device such as an LCD (Liquid Crystal Display), and is configured to display a variety of information on a screen in accordance with an instruction from the operation processing unit 160.

The storing unit 150 is formed of a storage device such as a hard disk and a memory, and is configured to store therein processing information and a program 1501 that are necessary for a variety of processing in the operation processing unit 160. The program 1501 is a program that is loaded to and executed by the operation processing unit 160 to realize various processing units, and is loaded in advance from an external device or a recording medium, which are not illustrated in the drawings, via a data input/output function such as the communication I/F unit 120 and stored into the storing unit 150. The processing information stored in the storing unit 150 majorly includes image 1502, personal item detection information 1503, skeleton detection information 1504, and reidentification personal item selection information 1505.

The image 1502 is an image captured by the camera 171. The image 1502 may be frame images composing a moving image captured by the camera 171. Alternatively, the image 1502 may be frame images obtained by downsampling the frame rate of a moving image captured by the camera 171. The image 1502 is provided with a shooting time. The shooting time of the image 1502 varies with images.

The personal item detection information 1503 is information related to a personal item detected from the image 1502. A personal item is a thing that a person holds or wears. In this example embodiment, a type to detect of a personal item is determined in advance. It does not matter whether a person actually hold or wear a personal item to detect. The type to detect of the personal item is, for example, a travel suitcase, a backpack, a bag, and the like, but is not limited thereto.

Figure 2:
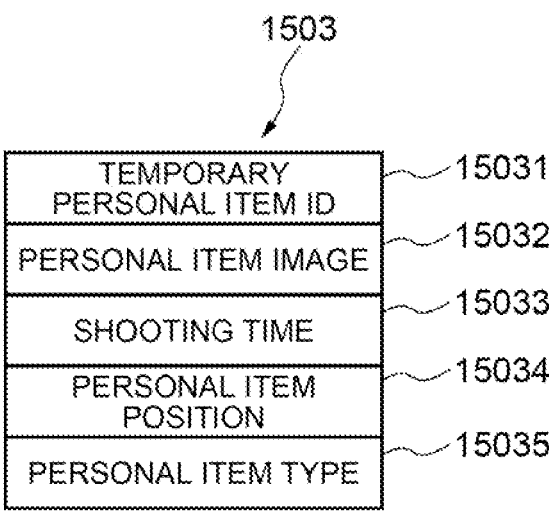
FIG. 2 is a view showing an example of a format of personal item detection information in the image processing apparatus according to the first example embodiment of the present invention.

FIG. 2 shows an example of a format of the personal item detection information 1503. The personal item detection information 1503 in this example is composed of items including temporary personal item ID 15031, personal item image 15032, shooting time 15033, personal item position 15034, and personal item type 15035. The temporary personal item ID 15031 is an identification number assigned to a personal item detected from the image 1502. The temporary personal item ID 15031 is an ID for uniquely identifying one or more personal items detected from the same image 1502. The personal item image 15032 is an image of the personal item detected from the image 1502. The personal item image 15032 is, for example, an image of the inside of a circumscribed rectangle of the image of the personal item. The shooting time 15033 is a shooting time of the image 1502 from which the personal item has been detected. The personal item position 15034 is a position of the personal item image 15032 on the image 1502. The personal item position 15034 may be, for example, the center of gravity of the personal item image 15032, the coordinate values of the four vertices of the circumscribed rectangle of the personal item image, or the like. The personal item type 15035 is a type (class) of a personal item such as a suitcase and a backpack.

The skeleton detection information 1504 is skeleton information of a person detected from the image 1502. The skeleton information of the person includes information representing the positions of joints forming a human body. A joint is also referred to as a skeletal point. Joints may include not only joints such as neck and shoulders, but also facial parts such as eyes and nose. The skeleton information of the person may further include, in addition to the positions of the joints, the degree of reliability (degree of likelihood of feature recognition) of each of the joints.

Figure 3:
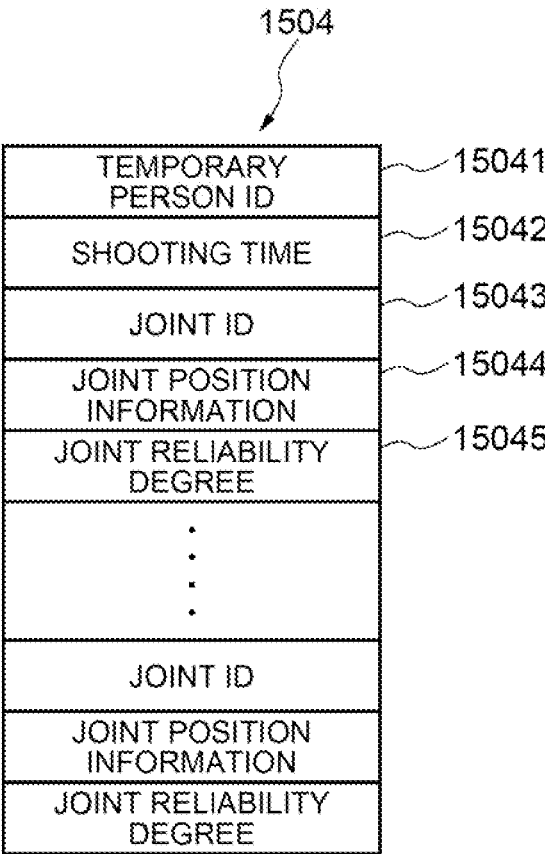
FIG. 3 is a view showing an example of a format of skeleton detection information in the image processing apparatus according to the first example embodiment of the present invention.

FIG. 3 shows an example of a format of the skeleton detection information 1504. The skeleton detection information 1504 in this example is composed of items including temporary person ID 15041, shooting time 15042, joint ID 15043, joint position information 15044, and joint reliability degree 15045. The temporary person ID 15041 is an identification number assigned to a person related to the skeleton information detected from the image 1502. This temporary person ID 15041 is an ID for uniquely identifying skeleton information of one or more persons detected from the same image 1502. The shooting time 15042 is a shooting time of the image 1502 from which the skeleton information has been detected. The joint ID 15043 is an ID for uniquely identifying each joint from among a plurality of joints. The joint position information 15044 is information representing the position of the joint identified by the joint ID 15043. The joint position information 15044 may be expressed by, for example, a set of X coordinate value and Y coordinate value of the joint on the image 1502. The joint reliability degree 15045 is information representing the degree of reliability of the joint identified by the joint ID 15043. A set of the joint ID 15043, the joint position information 15044 and the joint reliability degree 15045 is present for each of the joints composing the skeleton information of a person. However, the position information of all the joints is not necessarily detected. For example, in a case where a target person is obstructed by a personal item, a joint in an obstructed person region is not detected at all or, even when it is detected, it is not necessarily estimated correctly. Therefore, the value of the joint reliability degree 15045 of the joint in the obstructed person region is a value smaller than a preset threshold.

Figure 4:
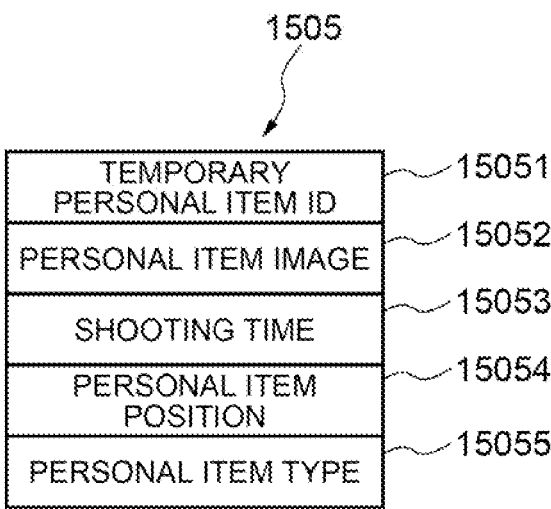
FIG. 4 is a view showing an example of a format of reidentification personal item selection information in the image processing apparatus according to the first example embodiment of the present invention.

The reidentification personal item selection information 1505 is information related to a personal item selected as a reidentification target from among one or more personal items detected from the image 1502. FIG. 4 shows an example of a format of the reidentification personal item selection information 1505. The reidentification personal item selection information 1505 of this example is composed of items including temporary personal item ID 15051, personal item image 15052, shooting time 15053, personal item position 15054, and personal item type 15055. The respective items of the temporary personal item ID 15051, the personal item image 15052, the shooting time 15053, the personal item position 15054 and the personal item type 15055 in the reidentification personal item selection information 1505 are copies of the items of the temporary personal item ID 15031, the personal item image 15032, the shooting time 15033, the personal item position 15034 and the personal item type 15035 in the personal item detection information 1503 shown in FIG. 2 selected as a reidentification target.

The operation processing unit 160 has a processor such as an MPU and a peripheral circuit thereof, and is configured to, by loading the program 1501 from the storing unit 150 and executing, make the abovementioned hardware and the program 1501 cooperate and realize various processing units. The processing units realized by the operation processing unit 160 mainly include an image acquiring unit 1601, a personal item detecting unit 1602, a skeleton information detecting unit 1603, a reidentification personal item selecting unit 1604, and a personal item reidentifying unit 1605.

The image acquiring unit 1601 is configured to acquire a plurality of images captured by the camera 171 or images obtained by downsampling the images from the image server 170 through the camera I/F unit 110, and store as the image 1502 into the storing unit 150.

The personal item detecting unit 1602 is configured to retrieve the image 1502 from the storing unit 150, detect a personal item from the image 1502, and store the personal item detection information 1503 into the storing unit 150. The personal item detecting unit 1602 is configured to, for example, input the image 1502 into a learning model trained by machine learning for estimating an image of a personal item (personal item image) and an object type (type of personal image) from a camera image, and thereby acquire an image of a personal item existing in the image 1502 and the type of the personal item from the learning model. For example, the learning model can be generated in advance by machine learning using a machine learning algorism such as a neural network with various camera images and images of various types of personal items in the camera images as training data. However, a method for detecting an image of a personal item and the type thereof from an image is not limited to the above, and may be a method such as pattern matching. The personal item detecting unit 1602 is also configured to calculate a temporary personal item ID, a shooting time, and a personal item position for each set of personal item image and object type having been detected, and store them together as personal item detection information 1503 into the storing unit 150. In general, an object detecting means such as the personal item detecting unit 1602 can detect a personal item region from an image even when an object (in this example, personal item) to be a detection target is occluded to some extent. In other words, the personal item detecting unit 1602 is configured to be able to detect not only a personal item whose entirety is almost captured, but also a personal item whose entirety is partly obstructed.

The skeleton information detecting unit 1603 is configured to retrieve the image 1502 from the storing unit 150, detect skeleton information of a person from the image 1502, and store the skeleton detection information 1504 related to the detected skeleton information of the person into the storing unit 150. The skeleton information detecting unit 1603 may be realized by using a system that estimates skeleton information of a person in an image by deep learning. The abovementioned system is, for example, OpenPose, HRNet, and AlphaPose. For example, in Open-Pose, the positions (x- and y-coordinates) and the degrees of reliability of 18 joints in total including nose, neck, right shoulder, right elbow, right wrist, left shoulder, left elbow, left wrist, right hip, right knee, right ankle, left hip, left knee, left ankle, right eye, left eye, right ear, and left ear are extracted.

The reidentification personal item selecting unit 1604 is configured to retrieve the personal item detection information 1503 and the skeleton detection information 1504 from the storing unit 150, select a personal item to reidentify therefrom, and store the reidentification personal item selection information 1505 related to the selected personal item to reidentify into the storing unit 150. The details of the reidentification personal item selecting unit 1604 will be described later.

The personal item reidentifying unit 1605 is configured to retrieve the reidentification personal item selection information 1505 from the storing unit 150, and reidentify a personal item using the reidentification personal item selection information 1505. That is to say, the personal item reidentifying unit 1605 determines whether or not a personal item related to any one reidentification personal item selection information 1505 among a plurality of reidentification personal item selection information 1505 stored in the storing unit 150 and a personal item related to any other one reidentification personal item selection information 1505 are identical personal items. Which reidentification personal item selection information 1505 among the plurality of reidentification personal item selection information 1505 is used for performing a reidentification process may be automatically determined by the personal item reidentifying unit 1605, or may be determined in accordance with an instruction input by an operator through the operation input unit 130, for example.

The personal item reidentifying unit 1605 is configured to, for example, input the personal item image 15052 of one reidentification personal item selection information 1505 and the personal item image 15052 of the other reidentification personal item selection information 1505 into a learning model trained by machine learning for estimating whether or not two personal item images are personal item images related to identical personal items, and thereby acquire an estimation result whether or not to be personal item images related to identical personal items from the learning model. For example, the learning model can be generated in advance by machine learning using a machine learning algorism such as a neural network with various personal item image pairs related to identical personal items and various personal item image pairs related to different personal items as training data. However, a method for determining whether or not two personal item images are personal item images related to identical personal items is not limited to the above method, and may be another method such as a method of determining whether or not a distance of feature vectors extracted from the two personal item images is equal to or less than a predetermined distance. Moreover, the personal item reidentifying unit 1605 may compare the personal item types 15055 of both the reidentification personal item selection information 1505 and, when the personal item types 15055 are not identical, determine that they are not personal item images related to identical personal items, whereas, when the personal item types 15055 are identical, perform identical personal item determination using the learning model or identical personal item determination using the feature vectors described above to determine whether or not to be identical. The personal item reidentifying unit 1605 may also be configured to store a reidentification result into the storing unit 150, or display on the screen display unit 140, or output to an external device through the communication I/F unit 120.

Figure 5:
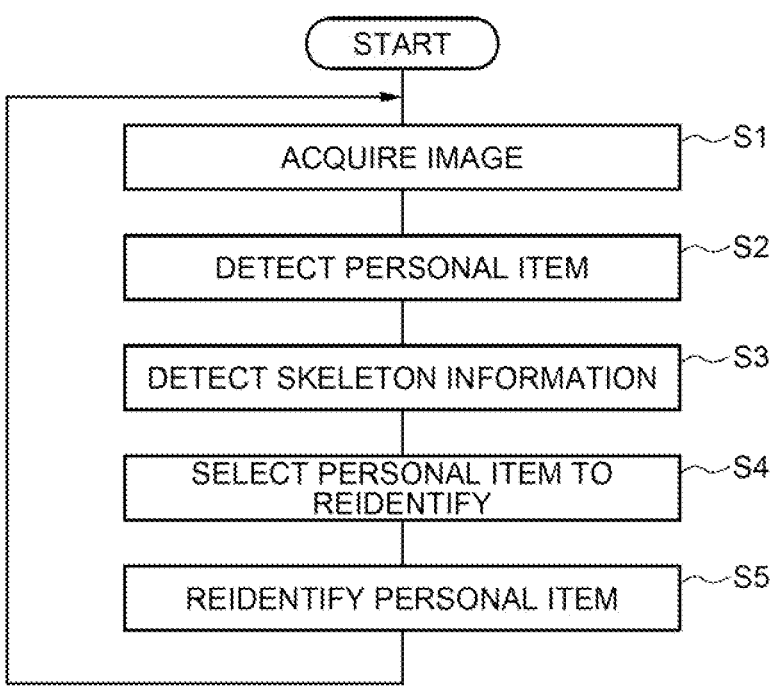
FIG. 5 is a flowchart showing an example of an operation of the image processing apparatus according to the first example embodiment of the present invention.

Subsequently, an operation of the image processing apparatus 100 will be described. FIG. 5 is a flowchart showing an example of an operation of the image processing apparatus 100. Referring to FIG. 5, first, the image acquiring unit 1601 acquires an image captured by the camera 171, and stores as the image 1502 into the storing unit 150 (step S1). Next, the personal item detecting unit 1602 retrieves the image 1502 from the storing unit 150, detects a personal item from the image 1502, and stores the personal item detection information 1503 into the storing unit 150 (step S2). Next, the skeleton information detecting unit 1603 retrieves the image 1502 from the storing unit 150, detects skeleton information of a person from the image 1502, and stores the skeleton detection information 1504 into the storing unit 150 (step S3). Next, the reidentification personal item selecting unit 1604 retrieves the personal item detection information 1503 and the skeleton detection information 1504 from the storing unit 150, selects a personal item to reidentify therefrom, and stores the reidentification personal item selection information 1505 related to the selected personal item to reidentify into the storing unit 150 (step S4). Next, the personal item reidentifying unit 1605 retrieves the reidentification personal item selection information 1505 from the storing unit 150, and reidentifies the personal item using the reidentification personal item selection information 1505 (step S5). Then, the image processing apparatus 100 returns to step S1 and repeats the same operation as the abovementioned operation.

Subsequently, the reidentification personal item selecting unit 1604 will be described in detail.

Figure 6:
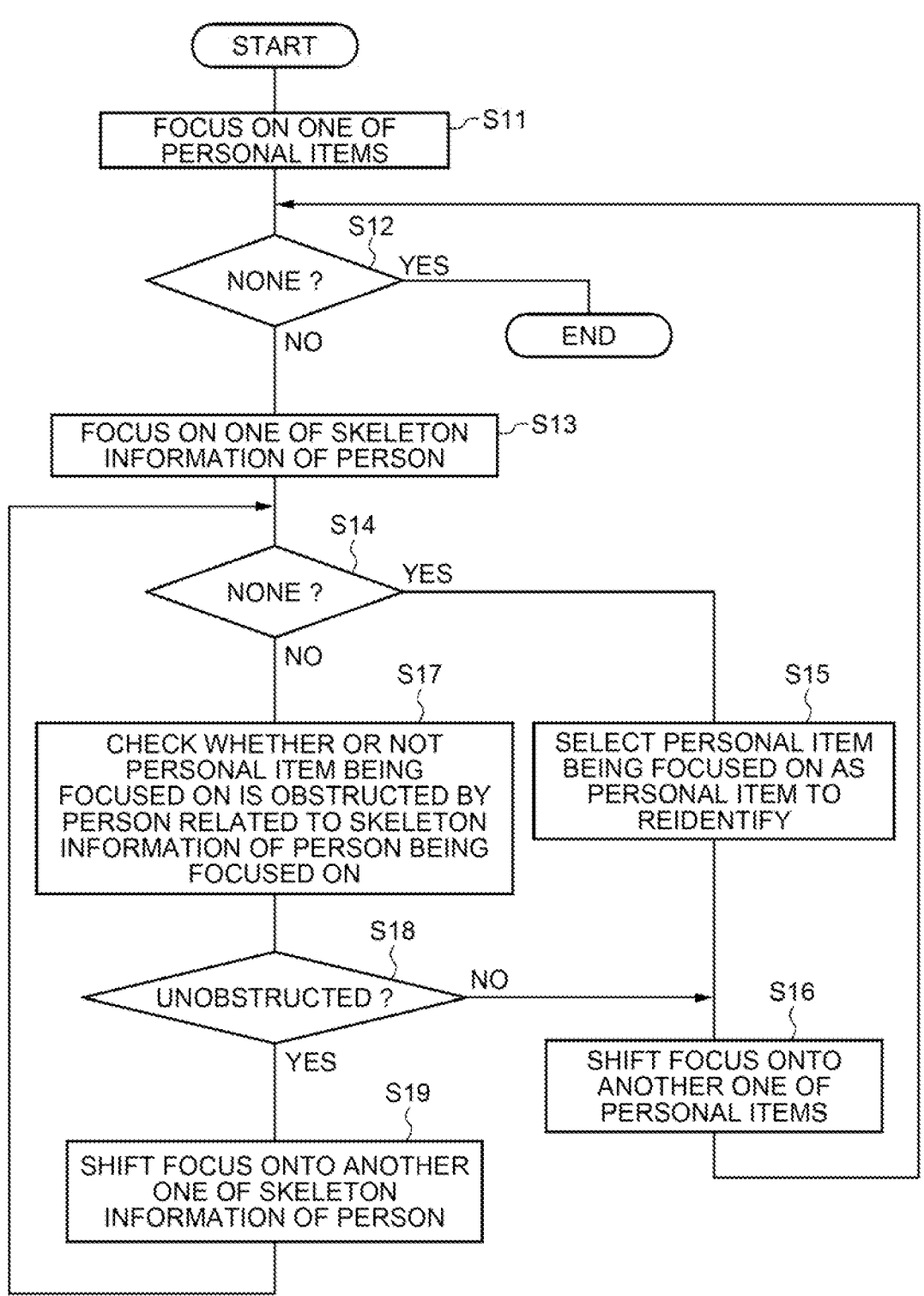
FIG. 6 is a flowchart showing an example of processing by a reidentification personal item selecting unit in the image processing apparatus according to the first example embodiment of the present invention.

FIG. 6 is a flowchart showing an example of processing by the reidentification personal item selecting unit 1604. When the processing by the personal item detecting unit 1602 and the skeleton information detecting unit 1603 on one image 1502 acquired by the image acquiring unit 1602 finishes, the reidentification personal item selecting unit 1604 retrieves, from the storing unit 150, the personal item detection information 1503 and the skeleton detection information 1504 detected from the image 1502, and starts the processing shown in FIG. 6.

First, the reidentification personal item selecting unit 1604 focuses on one of the personal item detection information 1503 detected from the image 1502 (step S11). When no personal item detection information 1503 exists (YES at step S11), the reidentification personal item selecting unit 1604 finishes the processing shown in FIG. 6. When the personal item detection information 1503 exists (NO at step S11), the reidentification personal item selecting unit 1604 focuses on one of the skeleton detection information 1504 detected from the image 1502 (step S13). When no skeleton detection information 1504 exists (YES at step S14), the reidentification personal item selecting unit 1604 copies the personal item detection information 1503 being focused on as the reidentification personal item selection information 1505, and stores into the storing unit 150 (step S15). Then, the reidentification personal item selecting unit 1604 shifts focus onto another one of the personal item detection information 1503 detected from the image 1502 (step S16), and returns to the processing at step S12 to repeat the same processing as the abovementioned processing. On the other hand, when the skeleton detection information 1504 exists (NO, at step S14), the reidentification personal item selecting unit 1604 checks whether or not a personal item related to the personal item detection information 1503 being focused on is obstructed by a person related to the skeleton detection information 1504 being focused on (step S17). The details of step S17 will be described later. Next, when the personal item related to the personal item detection information 1503 being focused on is obstructed by the person related to the skeleton detection information 1504 being focused on (NO at step S18), the reidentification personal item selecting unit 1604 determines not to select the personal item detection information 1503 being focused on, and returns to step S16 to repeat the same processing as the abovementioned processing. When the personal item related to the personal item detection information 1503 being focused on is not obstructed by the person related to the skeleton detection information 1504 being focused on (YES at step S18), the reidentification personal item selecting unit 1604 shifts focus onto another one of the skeleton detection information 1504 detected from the image 1502, and returns to step S14 to repeat the same processing as the abovementioned processing.

Figure 16:
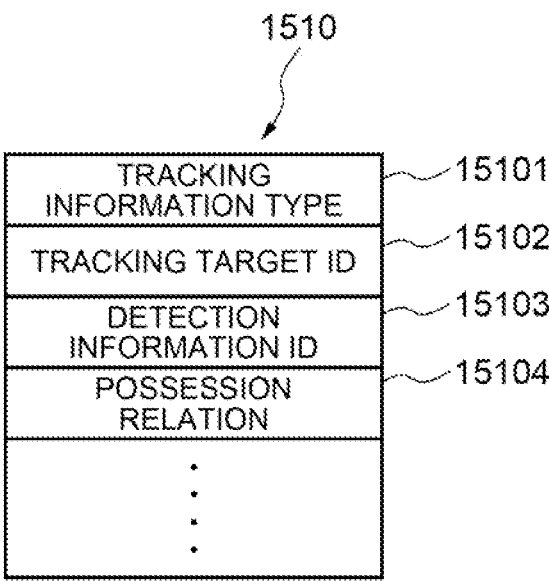
FIG. 16 is a view showing an example of a format of tracking information in the image processing apparatus according to the second example embodiment of the present invention.

Subsequently, the details of step S17 of FIG. 16, that is, a method for checking whether or not the personal item related to the personal item detection information 1503 being focused on is obstructed by the person related to the skeleton detection information 1504 being focused on will be described with an example. However, the method for checking whether or not the personal item related to the personal item detection information 1503 being focused on is obstructed by the person related to the skeleton detection information 1504 being focused on is not limited to the following example.

FIG. 7 is a flowchart showing an example of the details of step S17 of FIG. 6. Referring to FIG. 7, the reidentification personal item selecting unit 1604 first checks whether or not a condition 1 is satisfied that no joint of the skeleton information being focused on is included inside a circumscribed rectangle of the personal item being focused on (step S21). Here, the reidentification personal item selecting unit 1604 uses a joint whose joint reliability degree is equal to or more than a threshold value as a joint used for determination of the condition 1 and of a condition 2 and a condition 3 to be described later. Next, in a case where the condition 1 is satisfied (NO at step S22), the reidentification personal item selecting unit 1604 determines that the personal item being focused on is not obstructed by the person related to the skeleton information being focused on (step S23), and finishes the processing of FIG. 7.

Figure 8:
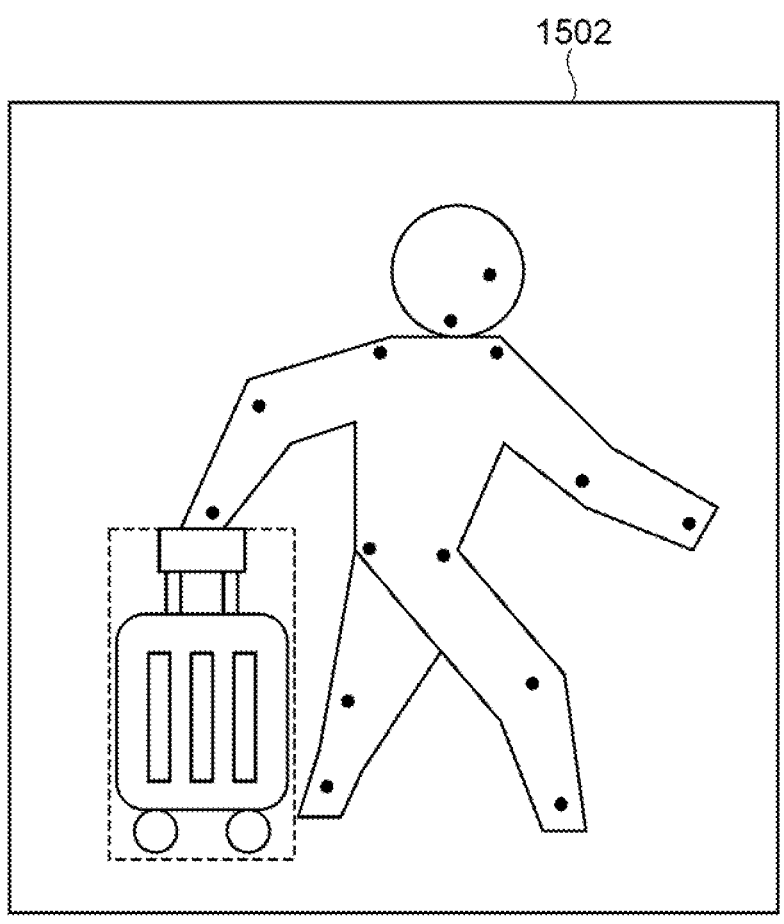
FIG. 8 is a schematic diagram showing an example of an image in which a condition 1 is satisfied that no joint of skeleton information is included inside a circumscribed rectangle of a personal item.

FIG. 8 is a schematic diagram showing an example of the image 1502 in which the condition 1 is satisfied. In the image 1502 shown in FIG. 8, a joint (black dot in the figure) of skeleton information detected from an image of a person does not exist at all in a circumscribed rectangle (dashed line in the figure) of a personal item (suitcase in the example shown by the figure). Such a situation occurs in a case where there is not overlap at all between a circumscribed rectangle of a personal item and a person as seen from the camera side. Therefore, a personal item whose circumscribed rectangle includes no joint of skeleton information of a person is determined not to be obstructed by the person.

On the other hand, in a case where the condition 1 is not satisfied (NO at step S22), the reidentification personal item selecting unit 1604 executes step S24 and step S25.

At step S24, the reidentification personal item selecting unit 1604 checks whether or not a condition 2 is satisfied that an area A1 of the circumscribed rectangle of the joint included inside the circumscribed rectangle of the personal item being focused on is less than T1% of an area A2 of the circumscribed rectangle of the personal item being focused on. Here, T1 is a threshold value of an area set in advance based on an allowable obstruction rate. Moreover, at step S25, the reidentification personal item selecting unit 1604 checks whether or not a condition 3 is satisfied that a minimum value L of a distance between one or more joints included inside the circumscribed rectangle of the personal item being focused on and the center of the circumscribed rectangle of the personal item being focused on is equal to or more than T2 (step S25). Here, T2 is a threshold value of a distance set in advance based on an allowable obstruction rate. T2 may be a value normalized based on the size of the circumscribed rectangle of the personal item being focused on. That is to say, T2 may be a value that is corrected to be smaller as the size of the circumscribed rectangle of the personal item being focused on is smaller and, on the contrary, to be larger as the size is larger. Alternatively, T2 may be a value obtained by multiplying the short side of the circumscribed rectangle of the personal item being focused on by a predetermined rate.

Next, in a case where at least one of the conditions 2 and 3 is satisfied (YES at step S26), the reidentification personal item selecting unit 1604 determines that the personal item being focused on is not obstructed by the person related to the skeleton information being focused on (step S23), and finishes the processing of FIG. 7. On the other hand, in a case where either the condition 2 or the condition 3 is not satisfied (NO step S26), the reidentification personal item selecting unit 1604 determines that the personal item being focused on is obstructed by the person related to the skeleton information being focused on (step S27), and finishes the processing of FIG. 7.

Figure 9:
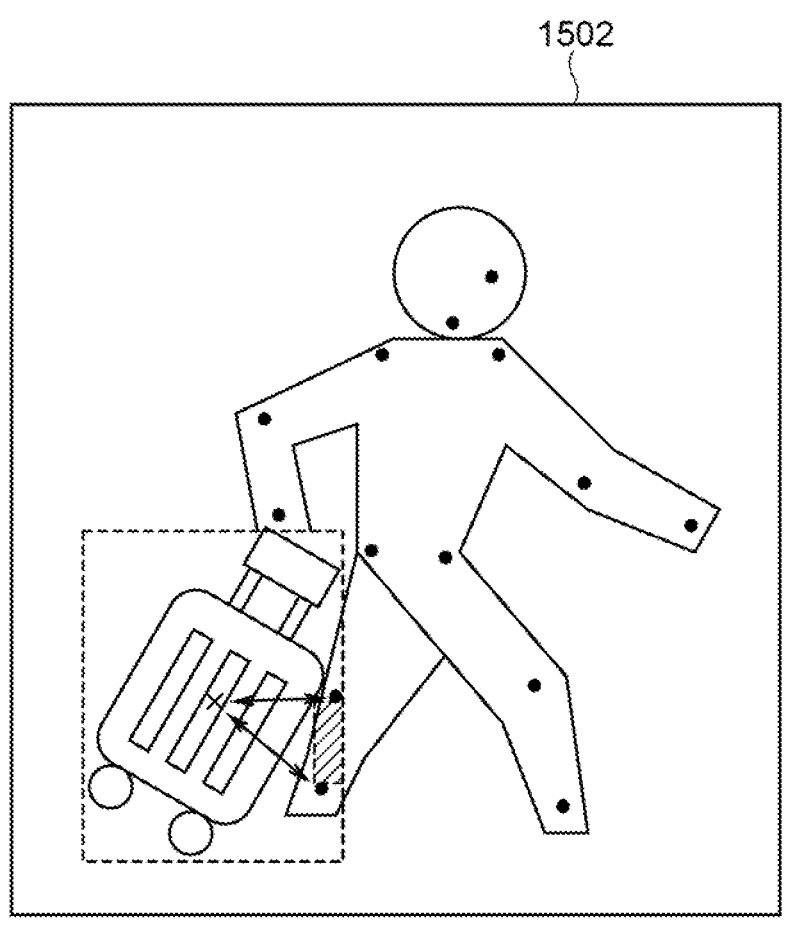
FIG. 9 is a schematic diagram showing an example of an image in which a condition 2 that the area of a circumscribed rectangle of a plurality of joints included inside a circumscribed rectangle of a personal item is less than T1% of the area of the circumscribed rectangle of the personal item or a condition 3 that a distance between a plurality of joints included inside a circumscribed rectangle of a personal item and the center of the circumscribed rectangle of the personal item is equal to or greater than T2 is satisfied.

FIG. 9 is a schematic diagram showing an example of the image 1502 in which the condition 1 is not satisfied and either the condition 2 or the condition 3 is satisfied. In the image 1502 shown in FIG. 9, some of joints (black dots in the figure) of skeleton information detected from an image of a person exist in a circumscribed rectangle (dashed line in the figure) of a personal item (a suitcase in the example shown by the figure), and therefore, there is a possibility that part of a region of the personal item is obstructed by a human body portion connecting the plurality of joints existing in the circumscribed rectangle of the personal item. However, in the image 1502 shown in FIG. 9, the condition 2 is satisfied that the area A1 of a circumscribed rectangle (hatched portion in FIG. 9) of the joints included inside the circumscribed rectangle of the personal item is less than T1% of the area A2 of the circumscribed rectangle of the personal item. Otherwise/also, in the image 1502 shown in FIG. 9, the condition 3 is satisfied that the minimum value of the distances between the one or more joints included inside the circumscribed rectangle of the personal item and the center of the circumscribed rectangle of the personal item (cross mark in FIG. 9) is equal to or more than T2. Such a situation occurs in a case where a personal item is not obstructed at all by a person as seen from the camera side, or in a case where the obstruction rate is less than a previously expected rate even when the personal item is obstructed. Therefore, the personal item that satisfies at least one of the conditions 2 and 3 is determined not to be obstructed by the person.

Figure 10:
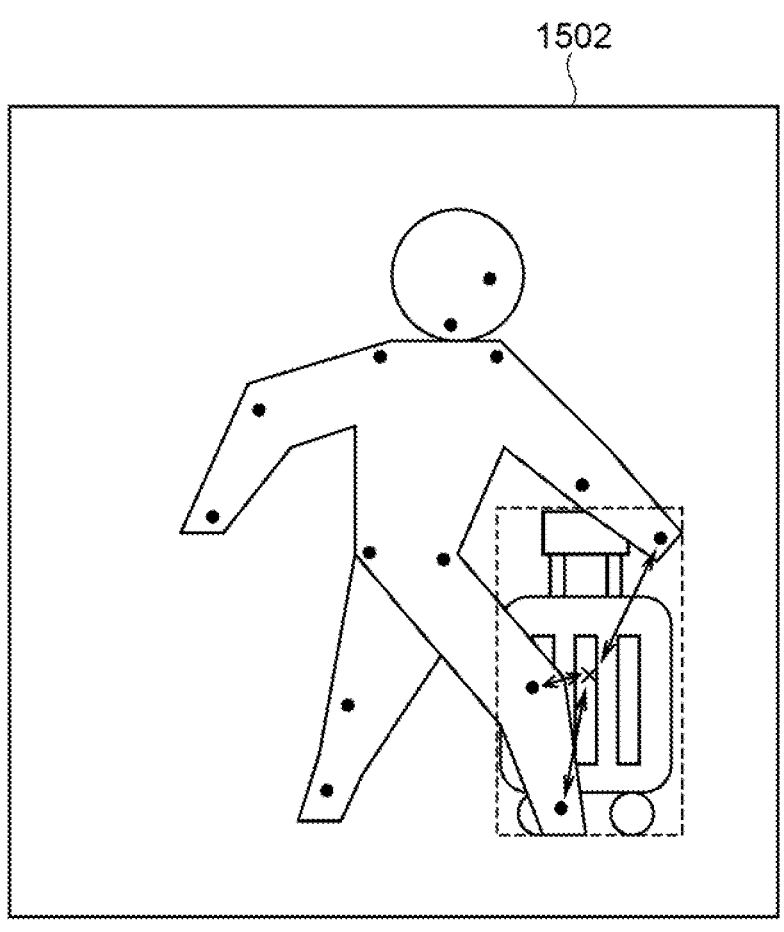
FIG. 10 is a schematic diagram showing an example of an image in which none of the condition 1, the condition 2, and the condition 3 is not satisfied.

FIG. 10 is a schematic diagram showing an example of the image 1502 in which none of the condition 1, the condition 2 and the condition 3 is satisfied. In the image 1502 shown in FIG. 10, some of joints (black dots in the figure) of skeleton information detected from an image of a person exist in a circumscribed rectangle (dashed line in the figure) of a personal item (a suitcase in the example shown by the figure). Moreover, in the image 1502 shown in FIG. 10, the condition 2 is not satisfied that the area A1 of a circumscribed rectangle of the joints included inside the circumscribed rectangle of the personal item is less than T1% of the area A2 of the circumscribed rectangle of the personal item. Moreover, in the image 1502 shown in FIG. 10, the condition 3 is not satisfied that the minimum value of the distances between the one or more joints included inside the circumscribed rectangle of the personal item and the center of the circumscribed rectangle of the personal item is equal to or more than T2. Such a situation occurs in a case where a personal item is obstructed by a person as seen from the camera side at a rate equal to or more than expected in advance. Therefore, the personal item that satisfies none of the condition 1, the condition 2, and the condition 3 is determined to be obstructed by the person.

As described above, the image processing apparatus 100 according to this example embodiment enables prevention of increase of incorrect personal item reidentification. The reason is that a difference in robustness to occlusion between object detection and reidentification is considered and, based on a personal item detected from the image 1502 and skeleton information of a person detected from the same image 1502, a personal item that is not obstructed by the person is selected as a personal item to reidentify.

Second Example Embodiment

Figure 11:
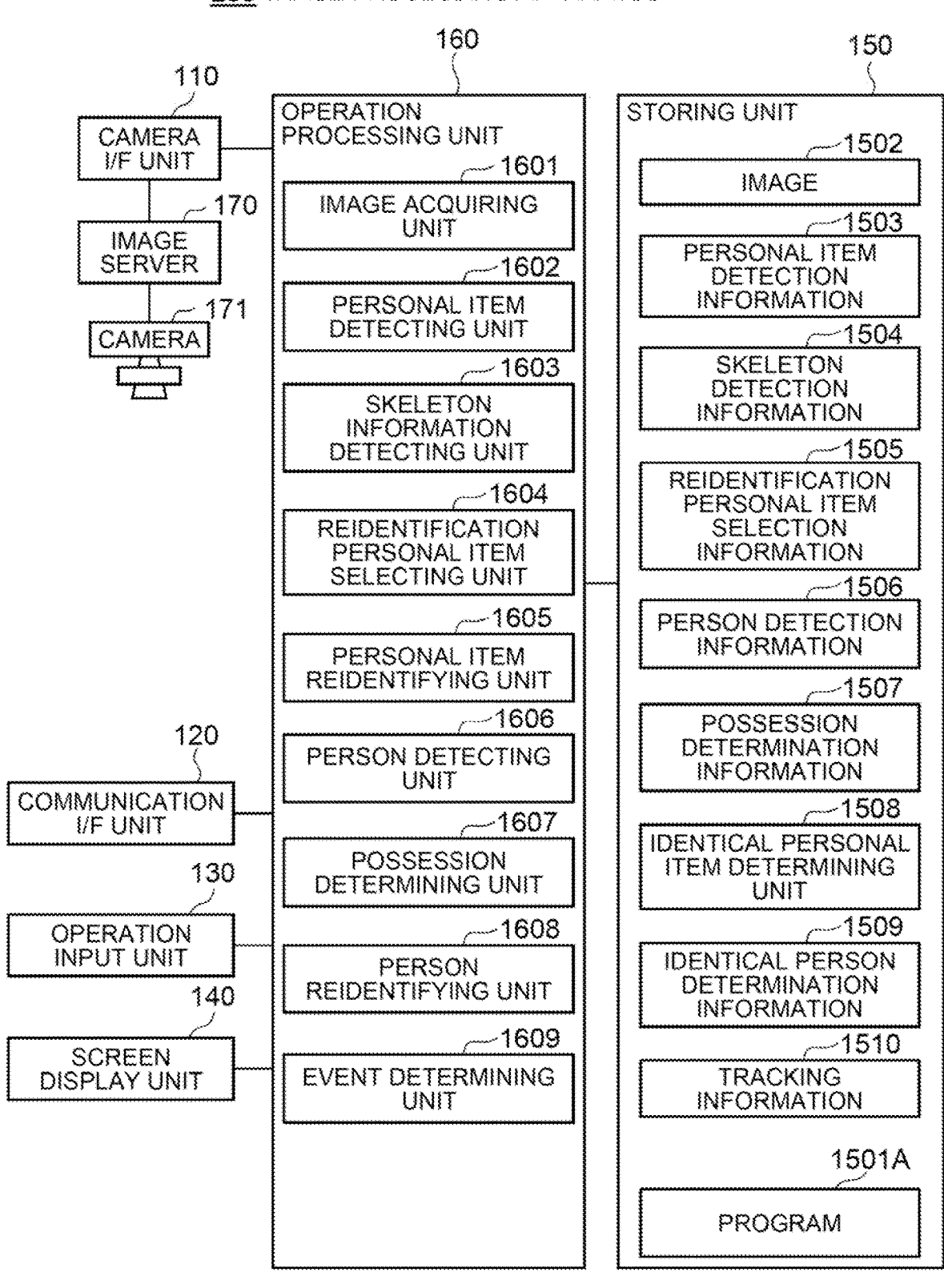
FIG. 11 is a block diagram of an image processing apparatus according to a second example embodiment of the present invention.

FIG. 11 is a block diagram of an image processing apparatus 200 according to a second example embodiment of the present invention, and the same reference numerals as in FIG. 1 denote the same parts. Referring to FIG. 11, the image processing apparatus 200 is different from the image processing apparatus 100 shown in FIG. 1 in further including a program 1501A, person detection information 1506, possession determination information 1507, identical personal item determination information 1508, identical person determination information 1509, tracking information 1510, a person detecting unit 1606, a possession determining unit 1607, a person reidentifying unit 1608 and an event determining unit 1609, and is otherwise the same as the image processing apparatus 100.

Figure 12:
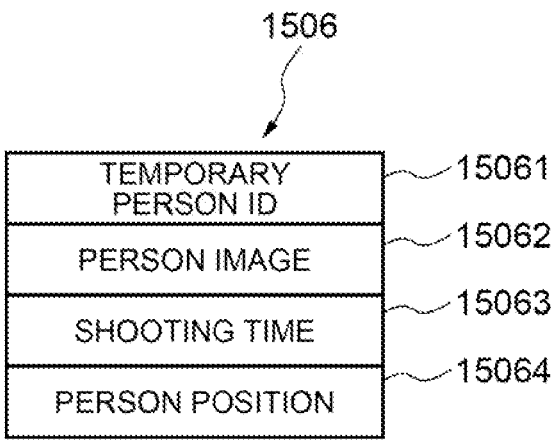
FIG. 12 is a view showing an example of a format of person detection information in the image processing apparatus according to the second example embodiment of the present invention.

The person detection information 1506 is information related to a person detected from the image 1502. FIG. 12 shows an example of a format of the person detection information. The person detection information 1506 in this example is composed of items including temporary person ID 15061, person image 15062, shooting time 15063, and person position 15064. The temporary person ID 15061 is an identification number assigned to a person detected from the image 1502. This temporary person ID 15061 is an ID for uniquely identifying one or more persons detected from the same image 1502. The person image 15062 is an image of the person detected from the image 1502. The person image 15062 is, for example, an image of the inside of a circumscribed rectangle of the image of the person. The shooting time 15063 is a shooting time of the image 1502 from which the person has been detected. The person position 15064 is a position of the person image 15062 on the image 1502. The person position 15064 can be, for example, the center of gravity of the person image 15062, but is not limited thereto, and may be the four vertices of the circumscribed rectangle of the person image.

Figure 13:
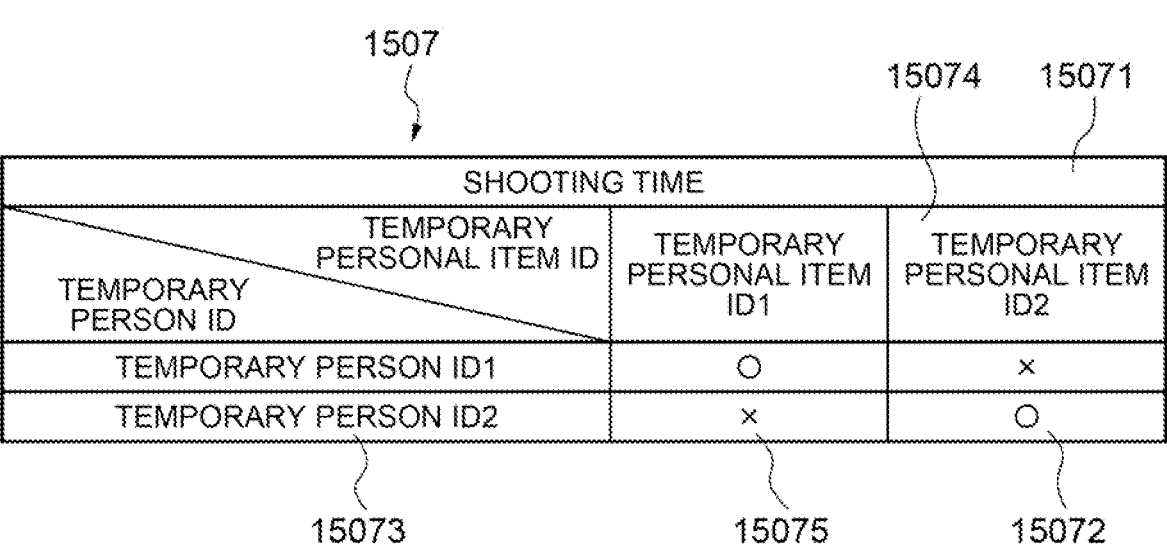
FIG. 13 is a view showing an example of a format of possession determination information in the image processing apparatus according to the second example embodiment of the present invention.

The possession determination information 1507 is information representing the result of determination whether a possession relation is present or absent between the person and the personal item detected from the image 1502. FIG. 13 shows an example of a format of the possession determination information 1507. The possession determination information 1507 in this example includes shooting time 15071 and matrix 15072. The shooting time 15071 is a shooting time of the image 1502. The matrix 15072 is formed such that the temporary person IDs 15073 are arranged in the vertical direction (column direction), the temporary personal item IDs 15074 are arranged in the horizontal direction (row direction), and the information of the presence or absence of the possession relation is recorded in an intersection 15075 of a row and a column. The number of rows of the matrix 15072 is equal to the number of persons detected from the image 1502. Moreover, the number of columns of the matrix 15072 is equal to the number of personal items to reidentify selected from the image 1502. For example, in the matrix 15072 shown in FIG. 13, a circle mark is drawn in the intersection of a temporary person ID 1 and a temporary personal item ID 1. This expresses that there is a possession relation between a person identified with the temporary person ID 1 and a personal item identified with the temporary personal item ID 1, namely, the person identified with the temporary person ID 1 possesses the personal item identified with the temporary personal item ID 1. Moreover, in the matrix 15072 shown in FIG. 13, a cross mark is drawn in the intersection of the temporary person ID 1 and a temporary personal item ID 2. This expresses that there is no possession relation between the person identified with the temporary person ID 1 and a personal item identified with the temporary personal item ID 2, namely, the person identified with the temporary person ID 1 does not possess the personal item identified with the temporary personal item ID 2.

Figure 14:
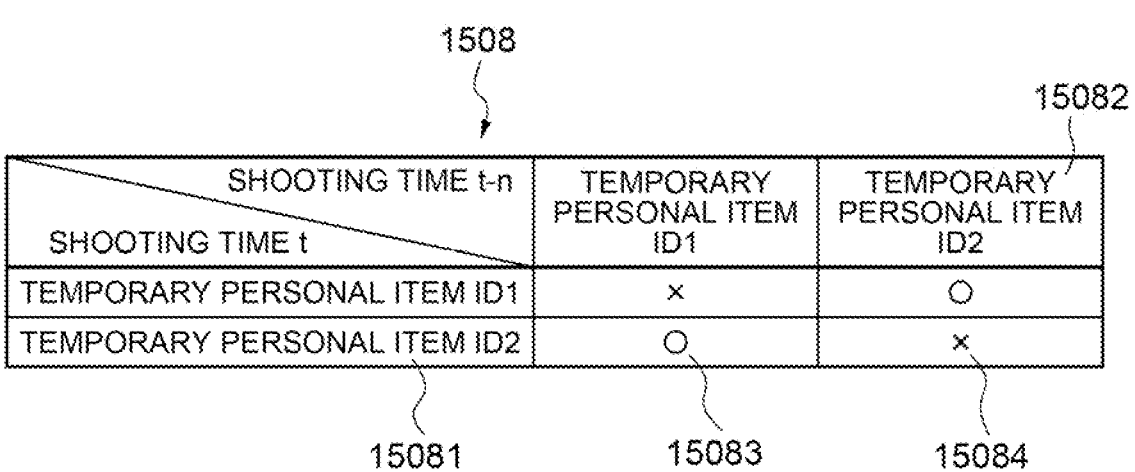
FIG. 14 is a view showing an example of a format of identical personal item determination information in the image processing apparatus according to the second example embodiment of the present invention.

The identical personal item determination information 1508 is information representing the result of determination whether or not an image of a personal item to reidentify selected by the reidentification personal item selecting unit 1604 from one of two images 1502 captured at different times and an image of a personal item to reidentify selected by the reidentification personal item selecting unit 1604 from the other image are personal item images related to identical personal items (the result of determination by the personal item reidentifying unit 1605). FIG. 14 shows an example of a format of the identical personal item determination information 1508. The identical personal item determination information 1508 in this example is formed of matrix 15084. The matrix 15084 is formed such that temporary personal item IDs 15081 identifying images of personal items to reidentify selected from, of two images captured at different times, the image 1502 at a latter shooting time t are arranged in the vertical direction (column direction), temporary personal item IDs 15081 identifying images of personal items to reidentify selected from the image 1502 at a former shooting time t-n are arranged in the horizontal direction (row direction), and information representing whether or not to be identical personal items is recorded in the intersection 15083 of a row and a column. The number of rows of the matrix 15084 is equal to the number of the personal items to reidentify selected from the latter image 1502. Moreover, the number of columns of the matrix 15084 is equal to the number of the personal items to reidentify selected from the former image 1502. For example, in the matrix 15084 shown in FIG. 14, a cross mark is drawn in the intersection of a temporary personal item ID 1 of the shooting time t and the temporary personal item ID 1 of the shooting time t-n. This expresses that the image of the personal item identified with the temporary personal item ID 1 of the shooting time t and the image of the personal item identified with the temporary personal item ID 1 of the shooting time t-n are not images related to identical personal items. Moreover, in the matrix 15084 shown in FIG. 14, a circle mark is drawn in the intersection of the temporary personal item ID 1 of the shooting time t and a temporary personal item ID 2 of the shooting time t-n. This expresses that the image of the personal item identified with the temporary personal item ID 1 of the shooting time t and the image of the personal item identified with the temporary personal item ID 2 of the shooting time t-n are images of identical personal items.

Figure 15:
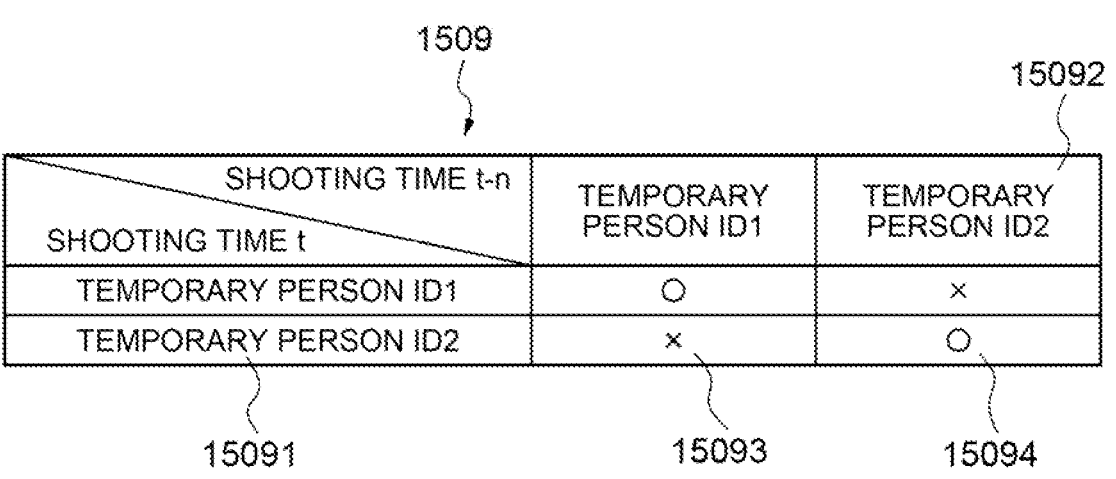
FIG. 15 is a view showing an example of a format of identical person determination information in the image processing apparatus according to the second example embodiment of the present invention.

The identical person determination information 1509 is information representing the result of determination whether or not an image of a person detected from one of two images 1502 captured at different times and an image of a person detected from the other image are person images related to identical persons. FIG. 15 shows an example of a format of the identical person determination information 1509. The identical person determination information 1509 in this example is formed of matrix 15094. The matrix 15094 is formed such that temporary person IDs 15091 identifying images of persons detected from, of two images captured at different times, the image 1502 at a latter shooting time t are arranged in the vertical direction (column direction), temporary person IDs 15092 identifying images of persons detected from the image 1502 at a former shooting time t are arranged in the horizontal direction (row direction), and information representing whether or not to be identical persons is recorded in the intersection 15093 of a row and a column. The number of rows of the matrix 15094 is equal to the number of the persons detected from the latter image 1502. Moreover, the number of columns of the matrix 15094 is equal to the number of the persons detected from the former image 1502. For example, in the matrix 15094 shown in FIG. 15, a circle mark is drawn in the intersection of the temporary person ID 1 of the shooting time t and the temporary person ID 1 of the shooting time t-n. This represents that the image of the person identified with the temporary person ID 1 of the shooting time t and the image of the person identified with the temporary person ID 1 of the shooting time t-n are images related to identical persons. Moreover, in the matrix 15094 shown in FIG. 15, a cross mark is drawn in the intersection of the temporary person ID 1 of the shooting time t and the temporary person ID 2 of the shooting time t-n. This represents that the image of the person identified with the temporary person ID 1 of the shooting time t and the image of the person identified with the temporary person ID 2 of the shooting time t-n are not images related to identical persons.

The tracking information 1510 is information in which person detection information related to identical persons or personal item detection information related to identical personal items are associated by shooting time and linked by a management number or the like. FIG. 16 shows an example of a format of the tracking information 1510. The tracking information 1510 in this example is composed of items including tracking information type 15101, tracking target ID 15102, detection information ID 15103, and possession relation ID 15104. The tracking information type 15101 is information representing whether the tracking information 1510 is person tracking information in which person detection information related to identical persons are associated or personal item tracking information in which personal item detection information related to identical personal items are associated. The tracking target ID 15102 is a person ID or a personal item ID assigned to a person or a personal item to be tracked. Unlike the abovementioned temporary person ID and temporary personal item ID, the tracking target ID 15102 is an ID that is unique over a plurality of shooting times.

There are as many sets of detection information ID 15103 and possession relation ID 15104 as there are person detection information related to identical persons or personal item detection information related to identical personal items. The detection information ID 15103 of one set is information identifying one person detection information or personal item detection information related to an identical person or an identical personal item. For example, the detection information ID 15103 may be a combination of the temporary person ID 15061 and the shooting time 15063 of the person detection information 1506, or a combination of the temporary object ID 15051 and the shooting time 15053 of the reidentification personal item selection information 1505. The possession relation ID 15104 is information representing whether or not personal item detection information or person detection information having a possession relation with person detection information or personal item detection information identified by the detection information ID 15103 of the same set is detected and, when detected, an ID that identifies the personal item detection information or person detection information having the possession relation (for example, a combination of the temporary personal item ID 15051 and the shooting time 15053 of the reidentification personal item selection information 1505, or a combination of the temporary person ID 15061 and the shooting time 15063 of the person detection information 1506).

The program 1501A is a program that is loaded to and executed by the operation processing unit 160 to realize various processing units. The processing units realized by the operation processing unit 160 include an image acquiring unit 1601, a personal item detecting unit 1602, a skeleton information detecting unit 1603, a reidentification personal item selecting unit 1604, a personal item reidentifying unit 1605, a person detecting unit 1606, a possession determining unit 1607, a person reidentifying unit 1608, and an event determining unit 1609. Among them, the image acquiring unit 1601, the personal item detecting unit 1602, the skeleton information detecting unit 1603, and the reidentification personal item selecting unit 1604 have already been described in the first example embodiment, and therefore, the detailed description thereof will be omitted.

The personal item reidentifying unit 1605 is configured to, in addition to having the function described in the first example embodiment, store the result of reidentification as the identical personal item determination information 1508 into the storing unit 150.

The person detecting unit 1606 is configured to retrieve the image 1502 from the storing unit 150 and detect a person image from the image 1502. The person detecting unit 1606 is configured to, for example, input the image 1502 into a learning model trained by machine learning for estimating a person image from a camera image and thereby acquire a person image existing in the image 1502 from the learning model. The learning model can be generated in advance by machine learning using a machine learning algorithm such as a neural network with various camera images and various person images in the camera images as training data. However, a method for detecting a person image from the image 1502 is not limited to the above, and any method such as pattern matching may be used. The person detecting unit 1606 is also configured to calculate a temporary person ID, a shooting time and a person position for each detected person image, and store them together as the person detection information 1506 into the storing unit 150.

The possession determining unit 1607 is configured to retrieve, from the storing unit 150, the person detection information 1506 and the reidentification personal item selection information 1505 detected from the image 1502, determine the presence or absence of a possession relation between a person related to the person image and a personal item related the personal item image detected from the image 1502, and store the result of determination as the possession determination information 1507 into the storing unit 150. For example, the possession determining unit 1607 focuses on one of the person detection information 1506 detected from the image 1502, and determines, among the reidentification personal item selection information 1505 selected from the image 1502, the reidentification personal item selection information 1505 having the personal item position 15054 such that a distance in the image to the person position 15064 of the person detection information 1506 being focused on is equal to or less than a predetermined distance as having a possession relation with a person related to the person detection information being focused on, and determines the reidentification personal item selection information 1505 such that the abovementioned distance exceeds the predetermined distance as having no possession relation with the person related to the person detection information being focused on. The possession determining unit 1607 performs the same processing on the remaining person detection information 1506. Next, the possession determining unit 1607 expresses the result of the above determination in the form of the matrix 15072 shown in FIG. 13, provide it with the shooting time 15071 of the image 1502 to generate the possession determination information 1507, and stores into the storing unit 150.

The person reidentifying unit 1608 is configured to retrieve, from the storing unit 150, the person detection information detected from the latest image 1502 (hereinafter, referred to as the latest person detection information) 1506 and the person detection information detected from at least one past image 1502 having a temporally predetermined relation with the latest image 1502 (hereinafter, referred to as the past person detection information) 1506, and determine whether or not a person image related to the latest person detection information 1506 and a person image related to the at least one past person detection information 1506 are person images related to identical persons. The at least one past image having the temporally predetermined relation with the latest image 1502 may be the image 1502$i$ images before the latest image 1502 (i is a positive integer equal to or greater than 1). Alternatively, the at least one past image having the temporally predetermined relation with the latest image 1502 may be the image 1502$i$ images before the latest image 1502 and the image 1502$j$ images before the latest image 1502 (j is a positive integer greater than i). Although the number of the past images is one or two here, the number of the past images having the temporally predetermined relation with the latest image 1502 may be three or more.

The person reidentifying unit 1608 is configured to, for example, input a person image of the latest person detection information 1506 into a learning model trained by machine learning for estimating whether or not two person images are person images related to identical persons and thereby acquire the result of estimation whether or not to be person images related to identical persons from the learning model. The learning model can be generated in advance, for example, by machine learning using a machine learning algorithm such as a neural network with person image pairs related to various identical persons and person image pairs related to various different persons as training data. However, a method for determining whether or not two person images are person images related to identical persons is not limited to the above, and any method such as a method of determining whether or not a distance of feature vectors extracted from the two person images is equal to or less than a predetermined distance may be used.

Further, the person reidentifying unit 1608 is configured to express the result of determination whether or not the person image related to the latest person detection information 1506 and the person image related to the past person detection information 1506 are person images related to identical persons in the form of the matrix 15094 as shown in FIG. 15, and store into the storing unit 150.

The event determining unit 1609 is configured to, every time the processing on the latest image 1502 by the person detecting unit 1606, the reidentification personal item selecting unit 1604, the possession determining unit 1607, the person reidentifying unit 1608 and the personal item reidentifying unit 1605 is completed, retrieve the latest possession determination information 1507, identical person determination information 1509 and identical personal item determination information 1508 from the storing unit 150 and, based on these information, generate or update the tracking information 1510 related to identical persons or identical personal items as necessary. Moreover, the event determining unit 1609 is configured to analyze the generated or updated tracking information 1510 and thereby detect a change in the possession relation between person and personal item. The event determining unit 1609 is also configured to output (transmit) text, audio, image and the like representing information about the detected event to an external device through the communication I/F unit 120, or/and output (display) to the screen display unit 140. For example, the event determining unit 1609 may output an image obtained by synthesizing, with the image 1502 at a time point when a change in the possession relation is detected between person and personal item, a circumscribed rectangle of a person image in which the change in the possession relation is detected and a circumscribed rectangle of a personal item image.

Figure 17:
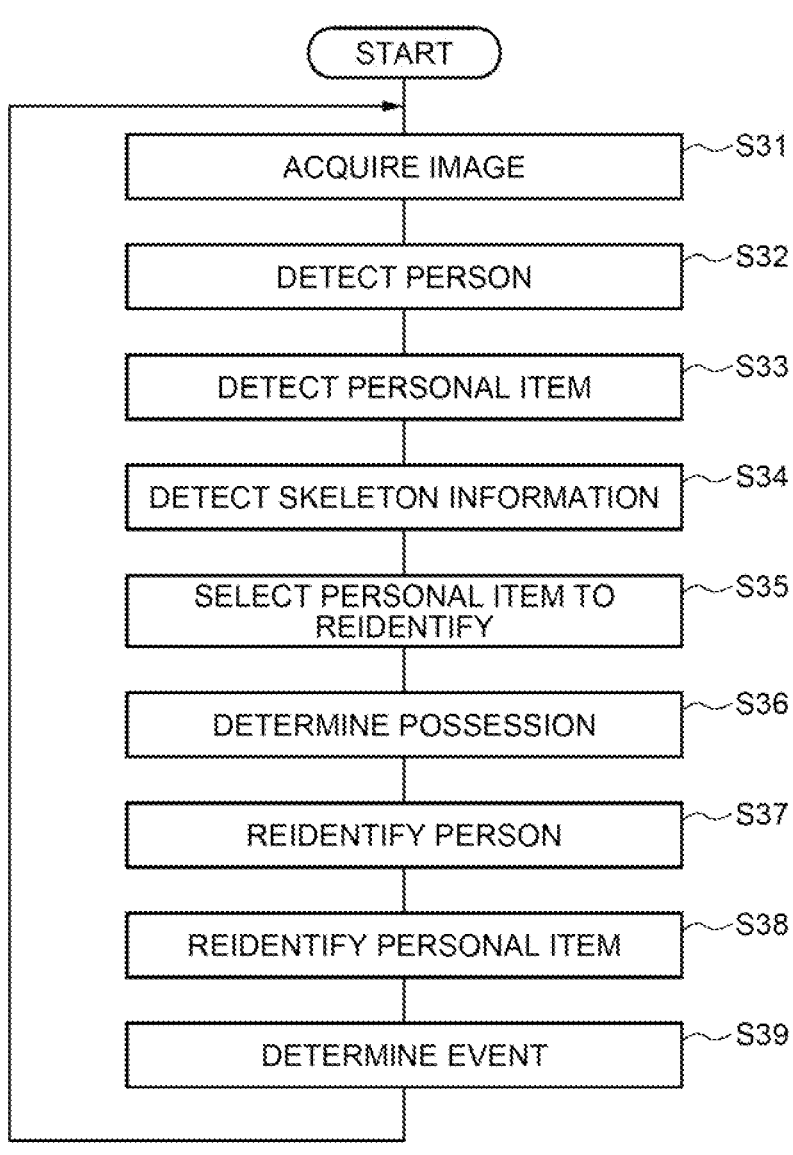
FIG. 17 is a flowchart showing an example of an operation of the image processing apparatus according to the second example embodiment of the present invention.

FIG. 17 is a flowchart showing an example of an operation of the image processing apparatus 200. Referring to FIG. 17, first, the image acquiring unit 1601 acquires a plurality of images captured by the camera 171 or images obtained by downsampling them from the image server 170 through the camera I/F unit 110, and stores as the image 1502 into the storing unit 150 (step S31). Next, the person detecting unit 1606 retrieves the latest image 1502 from the storing unit 150, detects a person image from the image 1502, and stores the person detection information 1506 into the storing unit 150 (step S32). Next, the personal item detecting unit 1602 retrieves the latest image 1502 from the storing unit 150, detects a personal item image from the image 1502, and stores the personal item detection information 1503 into the storing unit 150 (step S33). Next, the skeleton information detecting unit 1603 retrieves the latest image 1502 from the storing unit 150, detects skeleton information of a person from the image 1502, and stores the skeleton detection information 1504 into the storing unit 150 (step S34). Next, the reidentification personal item selecting unit 1604 retrieves the personal item detection information 1503 and the skeleton detection information 1504 detected from latest image from the storing unit 150, selects a personal item to reidentify therefrom, and stores the reidentification personal item selection information 1505 related to the selected personal item to reidentify into the storing unit 150 (step S35).

Next, the possession determining unit 1607 retrieves, from the storing unit 150, the person detection information 1506 and reidentification personal item selection information 1505 detected from the latest image 1502, determines the presence or absence of a possession relation between a person and a personal item related to the person image and the personal item image detected from the image 1502, and stores the result of determination as the possession determination information 1507 into the storing unit 150 (step S36). Next, the person reidentifying unit 1608 retrieves, from the storing unit 150, the person detection information 1506 detected from the latest image 1502 (latest person detection information) and the person detection information 1506 detected from at least one past image 1502 having a temporally predetermined relation with the latest image 1502 (past person detection information), determines whether or not the person image related to the latest person detection information 1506 and the person image related to the past person detection information 1506 are person images related to identical persons, and stores the identical person determination information 1509 into the storing unit 150 (step S37). Next, the personal item reidentifying unit 1605 retrieves, from the storing unit 150, the reidentification personal item selection information 1505 detected from the latest image 1502 (latest reidentification personal item selection information) and the reidentification personal item selection information 1505 detected from at least one past image 1502 having a temporally predetermined relation with the latest image 1502 (past reidentification personal item selection information), determines whether or not the personal item image related to the latest reidentification personal item selection information 1505 and the personal item image related to the past reidentification personal item selection information 1505 are personal item images related to identical personal items, and stores the identical personal item determination information 1508 into the storing unit 150 (step S38). Next, the event determining unit 1609 retrieves the latest possession determination information 1507, identical person determination information 1509 and identical personal item determination information 1508 from the storing unit 150, determines based on these information whether or not the possession relation between person and personal item has changed, transmits the result of determination to an external device through the communication I/F unit 120, or/and displays on the screen display unit 140 (step S39). After that, the image processing apparatus 200 returns to step S31, and repeats the same operation as the abovementioned operation.

Figure 18:
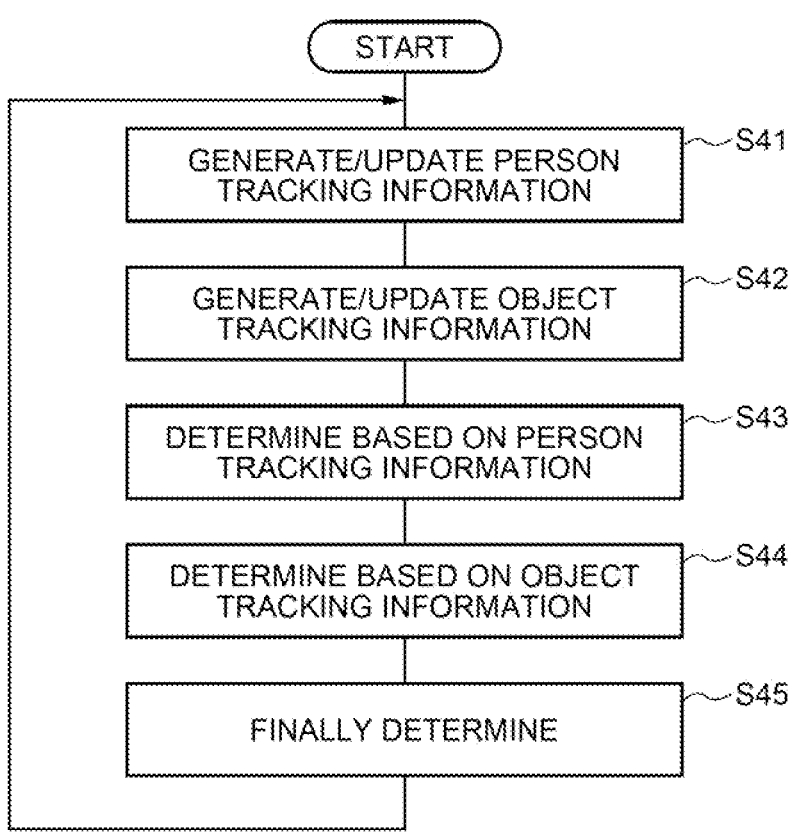
FIG. 18 is a flowchart showing the details of step S39 of FIG. 17.

FIG. 18 is a flowchart showing the details of step S39 executed by the event determining unit 1609. Referring to FIG. 18, first, the event determining unit 1609 generates/updates, for each identical person, the tracking information 1510 related to the identical person based on the latest personal item determination information 1507, identical person determination information 1509 and identical personal item determination information 1508 (step S41).

At step S41, the event determining unit 1609 newly generates, for a person determined to be identical to none of the persons detected from the past image by the person reidentifying unit 1608, namely, a person detected for the first time in the latest image 1502 among the persons detected from the latest image 1502, the tracking information 1510 related to the person. At the time, the event determining unit 1609 sets a type indicating a person, a person ID assigned to the person, the shooting time and temporary person ID of the person detection information 1506 of the person detected from the latest image 1502, a NULL value when it is determined by the possession determining unit 1607 that the person does not possess a personal item or information identifying a personal item (for example, shooting time and temporary object ID identifying the reidentification personal item selection information 1505) when determined that the person possesses, into the tracking information type 15101, the tracking target ID 15102, the detection information ID 15103, and the possession relation ID 15104 shown in FIG. 16, respectively.

Further, at step S41, the event determining unit 1609 adds, for a person determined to be identical to any of the persons detected from the past image by the person reidentifying unit 1608 among the persons detected from the latest image 1502, a pair of the latest detection information ID 15103 and possession relation ID 15104 to the tracking information 1510 already generated for the person. That is to say, the event determining unit 1609 adds the detection information ID 15103 in which the shooting time and temporary person ID of the person detection information 1506 of the person detected from the latest image 1502 and the possession relation ID 15104 in which a NULL value when the person does not possess a personal item in the latest image 1502 or information identifying a personal item when possesses is set.

Next, the event determining unit 1609 generates/updates, for each identical personal item, the tracking information 1510 related to the identical personal item based on the latest possession determination information 1507, identical person determination information 1509 and identical personal item determination information 1508 (step S42).

At step S42, the event determining unit 1609 newly generates, for a personal item determined to be identical to none of the personal items detected from the past image by the personal item reidentifying unit 1605 among the personal items detected from the latest image 1502, the tracking information 1510 related to the personal item. At the time, the event determining unit 1609 sets a type indicating a personal item, a personal item ID assigned to the personal item, the shooting time and temporary object ID of the reidentification personal item selection information 1505 of the personal item detected from the latest image 1502, a NULL value when it is determined by the possession determining unit 1607 that the personal item is not possessed by any person or information identifying a possessor (for example, shooting time and temporary person ID identifying the person detection information 1506) when determined that the personal item is possessed, into the tracking information type 15101, the tracking target ID 15102, the detection information ID 15103 and the possession relation ID 15104 shown in FIG. 16, respectively.

Further, at step S42, the event determining unit 1609 adds, for a personal item determined to be identical to any of the personal items detected from the past image by the personal item reidentifying unit 1605, namely, a personal item such that the tracking information 1510 related to the personal item already exists among the personal items detected from the latest image 1502, a pair of the latest detection information ID 15103 and possession relation ID 15104 to the tracking information 1510 related to the personal item. That is to say, the event determining unit 1609 adds the detection information ID 15103 in which the shooting time and temporary person ID of the reidentification personal item selection information 1505 of the persona item detected from the latest image 1502 and the possession relation ID 15104 in which a NULL value when the personal item is not possessed by any person in the latest image 1502 or information identifying a person who is a possessor when possessed is set.

Next, the event determining unit 1609 determines for each tracking information 1510 related to an identical person updated at step S41 whether or not a change in possession relation has occurred between the person and the personal item (step S43). Specifically, the event determining unit 1609 determines whether or not the person has changed from a personal item possessing state to a personal item non-possessing state, or, on the contrary, whether or not the person has changed from the personal item non-possessing state to the personal item possessing state, or whether or not the personal item has changed from one personal item to another personal item. For example, in the case of determining that the person has changed from the personal item possessing state to the personal item non-possessing state, the event determining unit 1609 generates determination information including a change type indicating a change from the possessing state to the non-possessing state, a person ID of the person, a time of the change, and a personal item ID of the personal item possessed before the change. Moreover, in the case of determining that the person has changed from the personal item non-possessing state to the personal item possessing state, the event determining unit 1609 generates determination information including a change type indicating a change from the non-possessing state to the possessing state, a person ID of the person, a time of the change, and a personal item ID of the personal item possessed after the change. Moreover, in the case of determining that the personal item of the person has changed from one personal item to another personal item, the event determining unit 1609 generates determination information including a change type indicating a change of the personal item, a person ID of the person, a time of the change, a personal item ID of the personal item possessed before the change, and a personal item ID of the personal item possessed after the change.

Next, the event determining unit 1609 determines for each tracking information 1510 related to the identical personal item updated at step S42 whether or not a change in possession relation has occurred between the personal item and the person (step S44). Specifically, the event determining unit 1609 determines whether or not the personal item has changed from a possessing state with a possessor to a non-possessing state without a possessor, or, on the contrary, whether or not the personal item has changed from the non-possessing state without a possessor to the possessing state with a possessor, or whether or not the possessor has changed from one person to another person. For example, in the case of determining that the personal item has changed from the possessing state with a possessor to the non-possessing state without a possessor, the event determining unit 1609 generates determination information including a change type indicating a change from the possessing state to the non-possessing state, a personal item ID of the personal item, a time of the change, and a person ID of the person who is the possessor before the change. Moreover, in the case of determining that the personal item has changed from the non-possessing state without a possessor to the possessing state with a possessor, the event determining unit 1609 generates determination information including a change type indicating a change from the non-possessing state to the possessing state, an object ID of the personal item, a time of the change, and a person ID of the person who is the possessor after the change. Moreover, in the case of determining that the possessor of the personal item has changed from one person to another person, the event determining unit 1609 generates determination information including a change type indicating a change of the possessor, a personal item ID of the personal item, a time of the change, a person ID of a person who is the possessor before the change, and a person ID of the person who is the possessor after the change.

Next, the event determining unit 1609 comprehensively determines the determination result based on the tracking information related to the identical person at step S43 and the determination result based on the tracking information related to the identical personal item at step S44, and finally determines whether or not a change in the possession relation has occurred between the person and the personal item (step S45).

For example, the event determining unit 1609 may consider the result of simply unifying the determination result based on the tracking information related to the identical person at step S43 and the determination result based on the tracking information related to the identical personal item at step S44 as a final determination result. Consequently, it is possible to detect without omission whether or not a change in the possession relation has occurred between the person and the personal item, compared to the case based on either the tracking information related to the identical person or the tracking information related to the identical personal item. The reason for this is that there is a case where a change in the possession relation between a person and a personal item that cannot be detected by tracking information related to an identical person can be detected by tracking information related to an identical object, and vice versa.

Further, the event determining unit 1609 may compare the determination result based on the tracking information related to the identical person at step S43 with the determination result based on the tracking information related to the identical personal item at step S44, and unify the logically same changes in the possession relation between the person and the personal item. For example, the event determining unit 1609 may unify a determination result based on tracking information related to an identical person such that a person A has changed from a personal item X possessing state to a personal item X non-possessing state at time t1 and a determination result based on tracking information related to an identical personal item such that the personal item X has changed from a possessing state with a possessor A to a non-possessing state without a possessor at time t1, and generate a determination result that a possession relation between the person A and the personal item X has changed from the possessing state to the non-possessing state at time t1. Consequently, it is possible to increase the accuracy of the determination result.

Also, the event determining unit 1609 may compare a determination result based on tracking information related to a certain person at step S43 with a determination result based on tracking information related to another person, and unify changes in a related possession relation between a plurality of persons and personal items. For example, the event determining unit 1609 may unify a determination result that a person A has changed from a personal item X possessing state to a non-possessing state at time t1 and a determination result that a person B has changed from the non-possessing state to the personal item X possessing state at a time close to time t1, and generate a determination result that the person A has handed over the personal item X to the person B at the time close to time t1. Alternatively, the event determining unit 1609 may unify a determination result that a person A changed from a personal item X possession state to a personal item Y possession state at time t1 and a determination result that a person B changed from the personal item Y possession state to the personal item X possession state at a time close to time t1, and generate a determination result that the personal item X possessed by the person A and the personal item Y possessed by the person B have been replaced between the person A and the person B at the time close to time t1.

Also, the event determining unit 1609 may compare a determination result based on tracking information related to a certain personal item at step S44 with a determination result based on tracking information related to another personal item, and unify changes in a related possession relation between a plurality of persons and personal items. For example, the event determining unit 1609 may unify a determination result that a personal item X has changed from a state of being possessed by a person A to a non-possessing state at time t and a determination result that the personal item X has changed from the non-possessing state to a state of being possessed by a person B at a time close to time t1, and generate a determination result that the personal item X has been handed over from the person A to the person B at the time close to time t1. Alternatively, the event determining unit 1609 may unify a determination result that the personal item X has changed from the state of being possessed by the person A to the state of being possessed by the person B at time t1 and a determination result that a personal item Y has changed from the possession state of being possessed by the person B to the possession state of being possessed by the person A at a time close to time t1, and generate a determination result that the personal item X possessed by the person A and the personal item Y possessed by the person B have been replaced between the person A and the person B at the time close to time t1.

As described above, according to the image processing apparatus 200 of this example embodiment, a change of the presence or absence of a possession relation between a person and a personal item can be detected, and also a change in a possession relation between a person and a personal item, that is, a change of a personal item of a certain person from a certain personal item to another personal item can be detected. Then, according to the image processing apparatus 200, a personal item detected from an image is not selected unconditionally as a personal item to reidentify, but a personal item that is not obstructed by a person is selected as a personal item to reidentify, so that increase of incorrect personal item reidentification by the personal item reidentifying unit 1605 can be prevented. Therefore, it is possible to prevent a situation in which a process of tracking an identical personal item fails on the way due to incorrect personal item reidentification.

Third Example Embodiment

Figure 19:
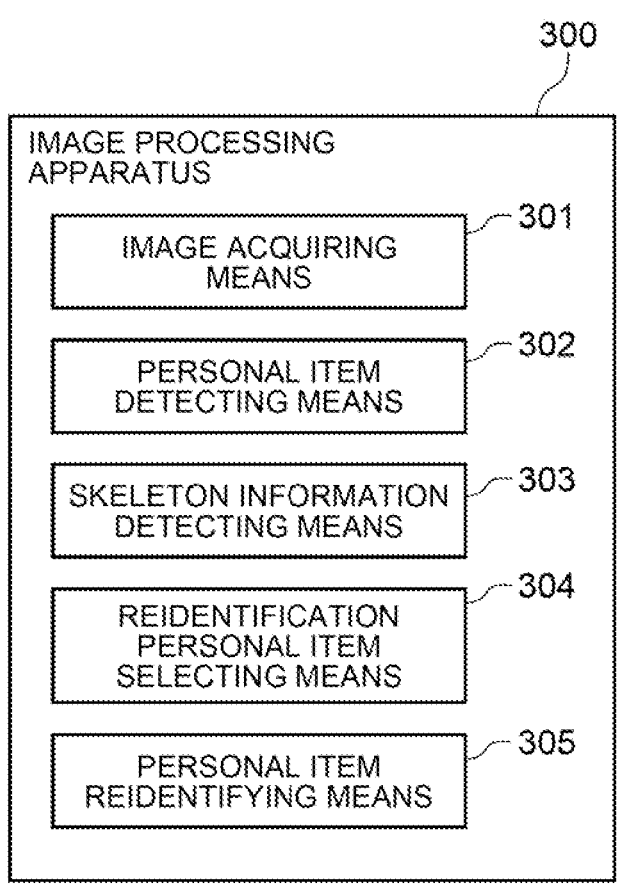
FIG. 19 is a view showing an example of a format of person detection information in an image processing apparatus according to a third example embodiment of the present invention.

Next, an image processing apparatus 300 according to a third example embodiment of the present invention will be described with reference to the drawings. FIG. 19 is a block diagram of the image processing apparatus 300. Referring to FIG. 19, the image processing apparatus 300 includes an image acquiring means 301, a personal item detecting means 302, a skeleton information detecting means 303, a reidentification personal item selecting means 304, and a personal item reidentifying means 305.

The image acquiring means 301 is configured to acquire a plurality of images captured at different times. The image acquiring means 301 can be configured, for example, in the same manner as the image acquiring unit 1601 of FIG. 1, but is not limited thereto.

The personal item detecting means 302 is configured to detect a personal item from each of the images acquired by the image acquiring means 301. The personal item detecting means 302 can be configured, for example, in the same manner as the personal item detecting unit 1602 of FIG. 1, but is not limited thereto.

The skeleton information detecting means 303 is configured to detect skeleton information of a person from each of the images acquired by the image acquiring means 301. The skeleton information detecting means 303 can be configured, for example, in the same manner as the skeleton information detecting unit 1603 of FIG. 1, but is not limited thereto.

The reidentification personal item selecting means 304 is configured to select a personal item to reidentify based on the personal item detected by the personal item detecting means 302 and the skeleton information of the person detected by the skeleton information detecting means 303. The reidentification personal item selecting means 304 can be configured, for example, in the same manner as the reidentification personal item selecting unit 1604 of FIG. 1, but is not limited thereto.

The personal item reidentifying means 305 is configured to determine whether or not a personal item to reidentify selected by the reidentification personal item selecting means 304 from one of the plurality of images acquired by the image acquiring means 301 and a personal item to reidentify selected by the reidentification personal item selecting means 304 from another one of the images are identical personal items. The personal item reidentifying means 305 can be configured, for example, in the same manner as the personal item reidentifying unit 1605 of FIG. 1, but is not limited thereto.

The image processing apparatus 300 thus configured operates in the following manner. That is to say, the image acquiring means 301 acquires a plurality of image captured at different times. Next, the personal item detecting means 302 detects a personal item from each of the images acquired by the image acquiring means 301. Next, the skeleton information detecting means 303 detects skeleton information of a person from each of the images acquired by the image acquiring means 301. Next, the reidentification personal item selecting means 304 selects a personal item to reidentify based on the personal item detected by the personal item detecting means 302 and the skeleton information of the person detected by the skeleton information detecting means 303. Next, the personal item reidentifying means 305 determines whether or not a personal item to reidentify selected by the reidentification personal item selecting means 304 from one of the plurality of images acquired by the image acquiring means 301 and a personal item to reidentify selected by the reidentification personal item selecting means 304 from another one of the images are identical personal items.

According to the image processing apparatus 300 that is configured and operates in the above manner, it is possible to prevent increase of incorrect reidentification of a personal item. The reason is that a difference in robustness to occlusion between object detection and reidentification is considered and, based on a personal item detected by the personal item detecting means 302 from an image acquired by the image acquiring means 301 and skeleton information of a person detected by the skeleton information detecting means 303 from the same image, a personal item that is not obstructed by the person is selected as a personal item to reidentify by the reidentification personal item selecting means 304.

Although the present invention has been described above with reference to the respective example embodiments, the present invention is not limited to the above example embodiments. The configuration and details of the present invention can be changed in various manners that can be understood by one skilled in the art within the scope of the present invention.

For example, in the above example embodiments, processes such as detection of a personal item, detection of skeleton information, detection of a personal item to reidentify, and reidentification of a personal item are performed online, but may be performed offline.

INDUSTRIAL APPLICABILITY

The present invention can be utilized for reidentification of a personal item of a person and, in particular, can be utilized to a technique for detecting an event such as leaving, taking away and replacing a personal item by a person.

The whole or part of the example embodiments disclosed above can be described as, but not limited to, the following supplementary notes.

[Supplementary Note 1]
  An image processing apparatus comprising:
  an image accruing means acquiring a plurality of images captured at different times;
  a personal item detecting means detecting a personal item from each of the images;
  a skeleton information detecting means detecting skeleton information of a person from each of the images;
  a reidentification personal item selecting means selecting a personal item to reidentify by the detected personal item and skeleton information of the person; and
  a personal item reidentifying means determining whether or not a personal item to reidentify selected from one image of the plurality of images and a personal item to reidentify selected from another image of the images are identical personal items.

[Supplementary Note 2]
  The image processing apparatus according to Supplementary Note 1, wherein
  the reidentification personal item selecting means determines by the detected personal item and skeleton information of the person whether or not the personal item is obstructed by the person, and performs the selection based on a result of the determination.

[Supplementary Note 3]
  The image processing apparatus according to Supplementary Note 1 or 2, wherein
  the reidentification personal item selecting means determines whether or not a position of a joint included by the detected skeleton information of the person is in a circumscribed rectangle of the detected personal item, and performs the selection based on a result of the determination.

[Supplementary Note 4]
  The image processing apparatus according to any of Supplementary Notes 1 to 3, wherein
  in a case where positions of a plurality of joints included by the detected skeleton information of the person are in a circumscribed rectangle of the detected personal item, the reidentification personal item selecting means performs the selection based on a ratio of an area of a circumscribed rectangle of the positions of the plurality of joints to an area of the circumscribed rectangle of the detected personal item.

[Supplementary Note 5]
  The image processing apparatus according to any of Supplementary Notes 1 to 4, wherein
  in a case where a position of at least one joint included by the detected skeleton information of the person is in a circumscribed rectangle of the detected personal item, the reidentification personal item selecting means performs the selection based on a distance between the position of the joint and a position of a center of the circumscribed rectangle.

[Supplementary Note 6]
  The image processing apparatus according to any of Supplementary Notes 1 to 5, further comprising:
  a person detecting means detecting a person from each of the images;
  a possession determining means determining presence or absence of a possession relation between a person and a personal item detected from the same image;
  a person reidentifying means determining whether or not a person detected from one image of the plurality of images and a person detected from another image of the images are identical persons; and
  an event determining means determining based on results of the determination by the possession determining means, the person reidentifying means and the personal item reidentifying means whether or not a change of the possession relation has occurred between the person and the personal item, and outputting a result of the determination.

[Supplementary Note 7]
  An image processing method comprising:
  acquiring a plurality of images captured at different times;
  detecting a personal item from each of the images;
  detecting skeleton information of a person from each of the images;
  selecting a personal item to reidentify by the detected personal item and skeleton information of the person; and
  determining whether or not a personal item to reidentify selected from one image of the plurality of images and a personal item to reidentify selected from another image of the images are identical personal items.

[Supplementary Note 8]
  A computer-readable recording medium with a program recorded thereon, the program being for causing a computer to execute:
  a process of acquiring a plurality of images captured at different times;
  a process of detecting a personal item from each of the images;
  a process of detecting skeleton information of a person from each of the images;
  a process of selecting a personal item to reidentify by the detected personal item and skeleton information of the person; and a process of determining whether or not a personal item to reidentify selected from one image of the plurality of images and a personal item to reidentify selected from another image of the images are identical personal items.

REFERENCE SIGNS LIST 100 image processing apparatus
110 camera I/F unit
120 communication I/F unit
130 operation input unit
140 screen display unit
150 storing unit
160 operation processing unit
170 image server
171 camera
200 image processing apparatus
300 image processing apparatus
301 image acquiring means
302 personal item detecting means
303 skeleton information detecting means
304 reidentification personal item selecting means
305 personal item reidentifying means
1501 program
1501A program
1502 image
1503 personal item detection information
1504 skeleton detection information
1505 reidentification personal item selection information
1506 person detection information
1507 possession determination information
1508 identical personal item determination information
1509 identical person determination information
1510 tracking information
1601 image acquiring unit
1602 personal item detecting unit
1603 skeleton information detecting unit
1604 reidentification personal item selecting unit
1605 personal item reidentifying unit
1606 person detecting unit
1607 possession determining unit

What is claimed is:

1. An image processing apparatus for improving personal item reidentification accuracy based on input images from a plurality of cameras, the image processing apparatus comprising:
a memory containing program instructions; and
a processor coupled to the memory, wherein the processor is configured to execute the program instructions to:
acquire a plurality of images captured at different times;
detect a personal item from each of the images;
detect skeleton information of a person from each of the images;
select a personal item to reidentify by the detected personal item and skeleton information of the person;
reidentify the selected personal item based on a pre-trained machine learning model; and
determine whether or not a personal item to reidentify selected from one image of the plurality of images and a personal item to reidentify selected from another image of the images are identical personal items,
wherein the processor is further configured to execute the program instructions to:

in the selection, in a case where positions of a plurality of joints included by the detected skeleton information of the person are in a circumscribed rectangle of the detected personal item, the selection based on a ratio of an area of a circumscribed rectangle of the positions of the plurality of joints to an area of the circumscribed rectangle of the detected personal item or a distance between the position of the joint and a position of a center of the circumscribed rectangle.

2. The image processing apparatus according to claim 1, wherein the processor is further configured to execute the program instructions to:
detect a person from each of the images;
determine presence or absence of a possession relation between a person and a personal item detected from the same image;
determine whether or not a person detected from one image of the plurality of images and a person detected from another image of the images are identical persons; and
based on determination results of the determination of the presence or absence of the possession relation, the determination whether or not to be identical persons and the determination whether or not to be identical personal items, determine whether or not a change of the possession relation has occurred between the person and the personal item, and output a result of the determination.

3. An image processing method for improving personal item reidentification accuracy based on input images from a plurality of cameras, the image processing method comprising:
acquiring a plurality of images captured at different times;
detecting a personal item from each of the images;
detecting skeleton information of a person from each of the images;
selecting a personal item to reidentify by the detected personal item and skeleton information of the person;
reidentifying the selected personal item based on a pre-trained machine learning model; and
determining whether or not a personal item to reidentify selected from one image of the plurality of images and a personal item to reidentify selected from another image of the images are identical personal items,
wherein in the selection, in a case where positions of a plurality of joints included by the detected skeleton information of the person are in a circumscribed rectangle of the detected personal item, the selection based on a ratio of an area of a circumscribed rectangle of the positions of the plurality of joints to an area of the circumscribed rectangle of the detected personal item or a distance between the position of the joint and a position of a center of the circumscribed rectangle.

4. A non-transitory computer-readable recording medium with a program recorded thereon for improving personal item reidentification accuracy based on input images from a plurality of cameras, the program comprising instructions for causing a computer to execute:
a process of acquiring a plurality of images captured at different times;
a process of detecting a personal item from each of the images;
a process of detecting skeleton information of a person from each of the images;

a process of selecting a personal item to reidentify by the detected personal item and skeleton information of the person;

a process of reidentifying the selected personal item based on a pre-trained machine learning model; and a process of determining whether or not a personal item to reidentify selected from one image of the plurality of images and a personal item to reidentify selected from another image of the images are identical personal items, wherein in the selection, in a case where positions of a plurality of joints included by the detected skeleton information of the person are in a circumscribed rectangle of the detected personal item, the selection based on a ratio of an area of a circumscribed rectangle of the positions of the plurality of joints to an area of the circumscribed rectangle of the detected personal item or a distance between the position of the joint and a position of a center of the circumscribed rectangle.

* * * * *